(12) United States Patent
Meirav et al.

(10) Patent No.: US 11,413,631 B2
(45) Date of Patent: Aug. 16, 2022

(54) APPARATUS, METHODS AND SYSTEMS FOR SEPARATING PARTICLES FROM AIR AND FLUIDS

(71) Applicant: Enverid Systems, Inc., Needham, MA (US)

(72) Inventors: Udi Meirav, Newton, MA (US); Israel Biran, Avihayil (IL); Sharon Perl-Olshvang, Newton, MA (US); Shawn Brown, Wakefield, MA (US)

(73) Assignee: ENVERID SYSTEMS, INC., Westwood, MA (US)

( * ) Notice: Subject to any disclaimer, the term of this patent is extended or adjusted under 35 U.S.C. 154(b) by 593 days.

(21) Appl. No.: 15/747,393

(22) PCT Filed: Jul. 25, 2016

(86) PCT No.: PCT/US2016/043922
§ 371 (c)(1),
(2) Date: Jan. 24, 2018

(87) PCT Pub. No.: WO2017/019628
PCT Pub. Date: Feb. 2, 2017

(65) Prior Publication Data
US 2018/0207651 A1 Jul. 26, 2018

Related U.S. Application Data

(60) Provisional application No. 62/275,807, filed on Jan. 7, 2016, provisional application No. 62/248,852, filed
(Continued)

(51) Int. Cl.
*B01D 45/12* (2006.01)
*B04C 5/28* (2006.01)
(Continued)

(52) U.S. Cl.
CPC ............... *B04C 5/28* (2013.01); *B01D 45/12* (2013.01); *B01D 45/16* (2013.01); *B04C 3/04* (2013.01);
(Continued)

(58) Field of Classification Search
CPC .. B04C 5/28; B04C 3/04; B04C 5/185; B04C 5/23; B04C 2009/008; B01D 45/16; A47L 9/1633; A47L 9/1641
See application file for complete search history.

(56) References Cited

U.S. PATENT DOCUMENTS 2,268,170 A * 12/1941 Schmidt ............... B04C 5/28
55/342.1
2,281,610 A * 5/1942 Watson ................. B04C 5/28
55/344

(Continued)

FOREIGN PATENT DOCUMENTS

CN 1788855 A 6/2006
CN 1795804 A 7/2006
(Continued)

OTHER PUBLICATIONS

International Search Report and Written Opinion for PCT/US2016/043922, dated Dec. 1, 2016.
(Continued)

*Primary Examiner* — Dung H Bui
(74) *Attorney, Agent, or Firm* — Cooley LLP

(57) ABSTRACT

Some embodiments of the disclosure are directed to an air/fluid filter device comprising a sheet of material initially configured in one or more planar sections, a plurality of organized air/fluid outlets arranged on the sheet and configured to allow the air/fluid to flow through the sheet, and a plurality of cyclonic compartments coupled to the sheet, each compartment comprising a cyclonic structure compris-
(Continued)

ing at least one of a cone or a cylinder, including a tangential inlet, and a cyclonic outlet at the end of the cyclonic structure that is coupled to the sheet. In some embodiments, each tangential opening is in air/fluid communication with a respective incoming air/fluid side of the sheet, and each cyclonic outlet is coupled to a respective outlet of the sheet.

9 Claims, 19 Drawing Sheets

Related U.S. Application Data on Oct. 30, 2015, provisional application No. 62/196,686, filed on Jul. 24, 2015.

(51) Int. Cl.
   *B04C 3/04* (2006.01)
   *B04C 5/185* (2006.01)
   *B01D 45/16* (2006.01)
   *A47L 9/16* (2006.01)

(52) U.S. Cl.
   CPC ............ *B04C 5/185* (2013.01); *A47L 9/1633* (2013.01); *A47L 9/1641* (2013.01)

(56) References Cited

U.S. PATENT DOCUMENTS

| | | | | |
|---|---|---|---|---|
| 2,734,630 A * | 2/1956 | Van Der Wal | .......... | B04C 5/081 209/728 |
| 2,854,092 A * | 9/1958 | Gustavsson | ............... | B04C 5/28 55/349 |
| 2,874,801 A * | 2/1959 | Van Der Kolk | .. | H01J 37/32935 55/348 |
| 3,074,219 A * | 1/1963 | Phyl | ............. | B04C 5/28 55/348 |
| 3,261,467 A * | 7/1966 | Wikdahl | .................... | B04C 5/28 209/728 |
| 3,350,852 A * | 11/1967 | Schindling | ................ | B04C 5/28 55/348 |
| 3,747,306 A * | 7/1973 | Wikdahl | .................... | B04C 5/28 55/349 |
| 3,915,679 A | 10/1975 | Roach et al. | | |
| 3,959,123 A * | 5/1976 | Wikdahl | .................... | B04C 5/28 209/728 |
| 4,123,364 A * | 10/1978 | Mozley | ...................... | B04C 5/28 210/512.2 |
| 4,242,115 A | 12/1980 | Harold et al. | | |
| 4,430,100 A * | 2/1984 | Cardo | .................... | B01D 45/12 209/154 |
| 4,460,391 A * | 7/1984 | Muller | .................... | B01D 45/12 55/343 |
| 4,539,105 A * | 9/1985 | Metcalf | ...................... | B04C 5/08 156/84 |
| 4,687,497 A * | 8/1987 | Owen | .................. | C10G 11/182 55/349 |
| 4,702,846 A * | 10/1987 | Ryynanen | ............... | B01D 45/12 209/722 |
| 5,403,367 A * | 4/1995 | De Villiers | ............ | B01D 45/16 55/320 |
| 5,947,300 A | 9/1999 | Lange | | |
| 5,980,639 A * | 11/1999 | Trickey | ................... | B04C 5/081 127/24 |
| 6,129,217 A | 10/2000 | Trickey et al. | | |
| 6,270,544 B1 * | 8/2001 | Mencher | ................ | B01D 45/16 55/318 |
| 7,931,718 B2 | 4/2011 | Cheng | | |
| 2003/0057151 A1 * | 3/2003 | Kopec | ....................... | B04C 3/04 210/512.2 |
| 2006/0130445 A1 * | 6/2006 | Park | ....................... | A47L 9/1641 55/346 |
| 2006/0130449 A1 | 6/2006 | Han et al. | | |
| 2006/0168923 A1 * | 8/2006 | Lee | ........................ | A47L 9/1641 55/345 |
| 2006/0230717 A1 * | 10/2006 | Oh | ............................ | B04C 5/24 55/343 |
| 2006/0230719 A1 * | 10/2006 | Han | ...................... | A47L 9/1625 55/345 |
| 2007/0151453 A1 * | 7/2007 | Fukuma | ................. | B01D 45/12 95/271 |
| 2007/0234691 A1 | 10/2007 | Han et al. | | |
| 2008/0028940 A1 | 2/2008 | Han et al. | | |
| 2008/0148694 A1 | 6/2008 | Smith | | |
| 2009/0031680 A1 * | 2/2009 | Hyun | ..................... | B01D 45/16 55/345 |
| 2009/0036288 A1 * | 2/2009 | Hu | ............................ | B04C 3/02 494/13 |
| 2010/0224073 A1 * | 9/2010 | Oh | ........................ | A47L 9/1666 96/416 |
| 2010/0258008 A1 * | 10/2010 | Cheng | .................... | B01D 45/16 96/190 |
| 2010/0267540 A1 * | 10/2010 | Babb | ...................... | B01D 45/16 494/59 |
| 2012/0036675 A1 | 2/2012 | Conrad | | |
| 2012/0132075 A1 * | 5/2012 | Jarri | ...................... | B01D 46/003 95/268 |
| 2012/0209550 A1 | 8/2012 | Van Der Spek et al. | | |
| 2013/0220123 A1 * | 8/2013 | England | .................... | C02F 3/22 95/271 |
| 2014/0305311 A1 * | 10/2014 | Nakamura | ................ | B04C 5/28 96/228 |
| 2014/0373490 A1 | 12/2014 | Wuebbeling et al. | | |
| 2016/0332171 A1 * | 11/2016 | Moons | ..................... | B04C 5/04 |
| 2018/0207573 A1 | 7/2018 | Perl-Olshavang et al. | | |
| 2019/0091701 A1 | 3/2019 | Hyun et al. | | |
| 2019/0111375 A1 | 4/2019 | Chen et al. | | |
| 2020/0360847 A1 | 11/2020 | Perl-Olshavang et al. | | |

FOREIGN PATENT DOCUMENTS

| | | |
|---|---|---|
| CN | 101121155 A | 2/2008 |
| CN | 103889584 A | 6/2014 |
| EP | 1063017 A2 | 12/2000 |
| EP | 1063017 A3 | 12/2000 |
| EP | 1671571 A1 | 6/2006 |
| GB | 999938 A | 7/1965 |
| KR | 2012/0048850 A | 5/2012 |
| WO | WO 2010/121991 A1 | 10/2010 |
| WO | WO 2015/112010 A1 | 7/2015 |
| WO | WO 2017/019628 A1 | 2/2017 |
| WO | WO 2018/136968 A1 | 7/2018 |
| WO | WO 2019/018788 A1 | 1/2019 |
| WO | WO 2020/047437 A1 | 3/2020 |

OTHER PUBLICATIONS

International Preliminary Report on Patentability for PCT/US2016/043922, dated Jan. 30, 2018.

Chinese Office Action dated Apr. 3, 2020, in Chinese Patent Application No. 201680054762.7, with English translation, 9 pages.

Chinese Office Action dated Dec. 10, 2020, in Chinese Patent Application No. 201680054762.7, with English translation, 6 pages.

* cited by examiner

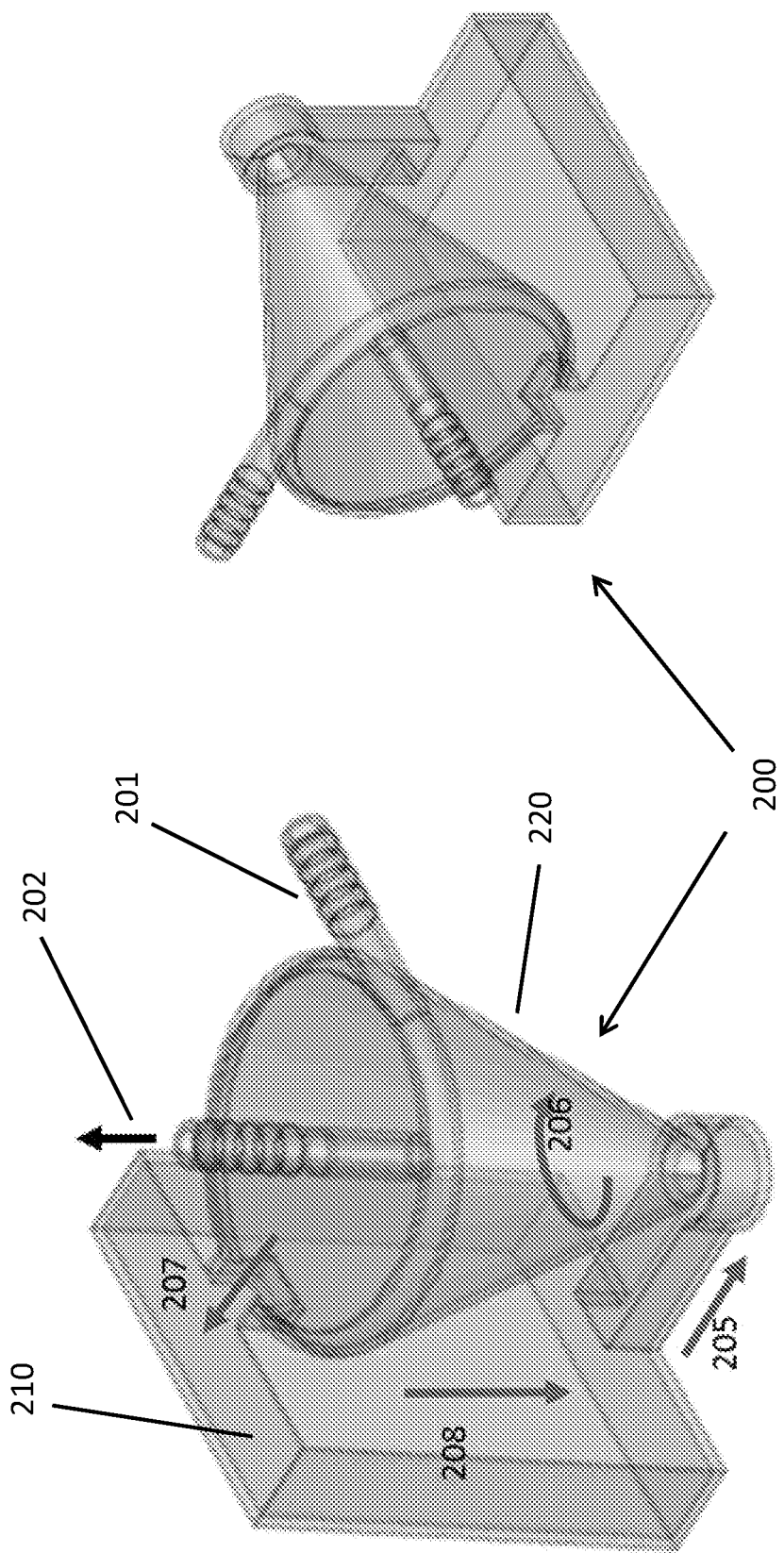

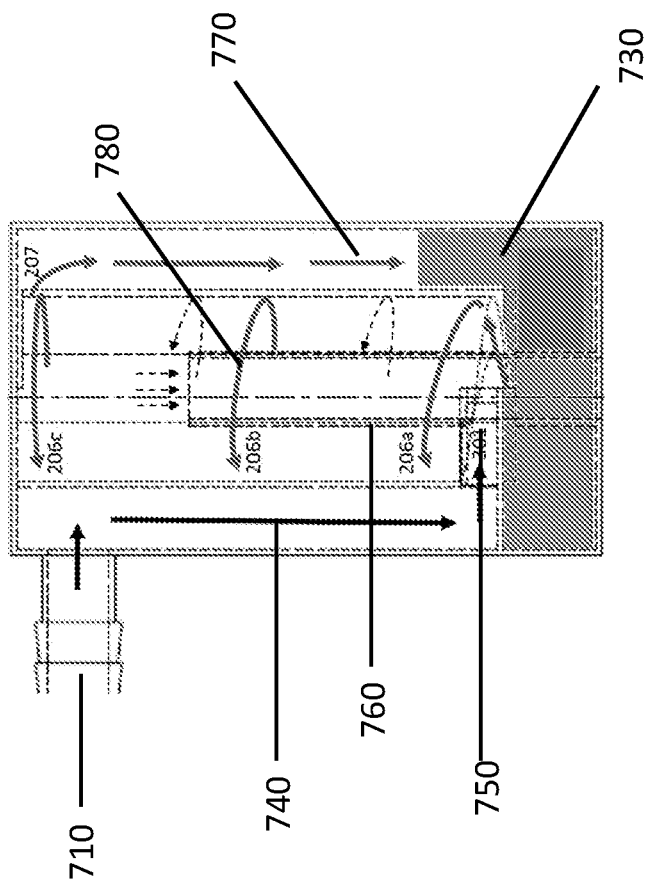
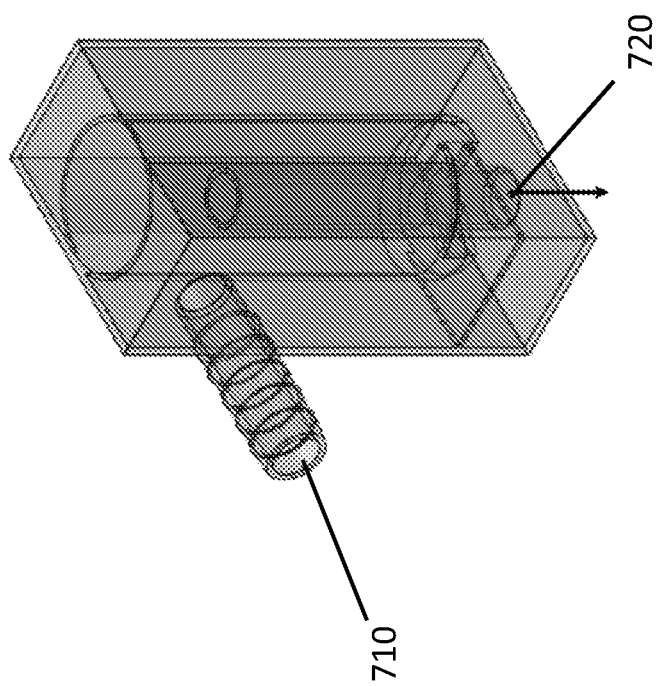
FIGURE 9B
FIGURE 9A

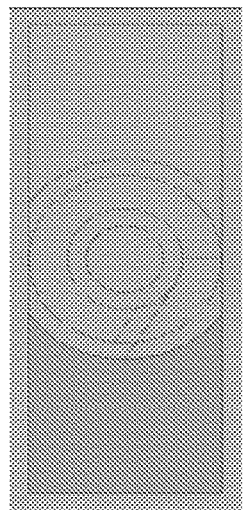
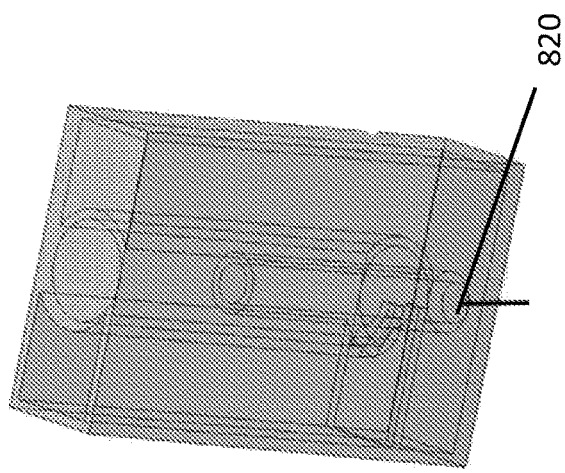
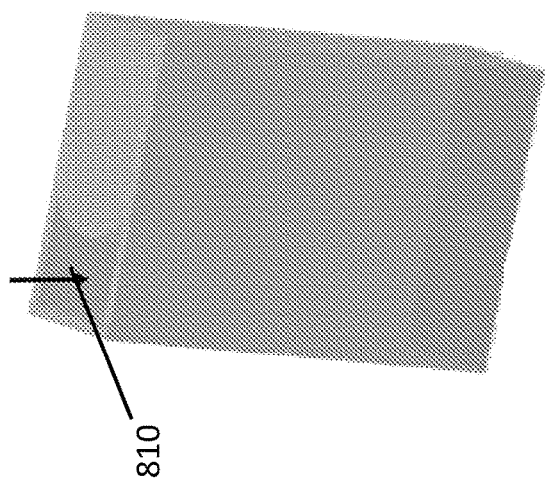
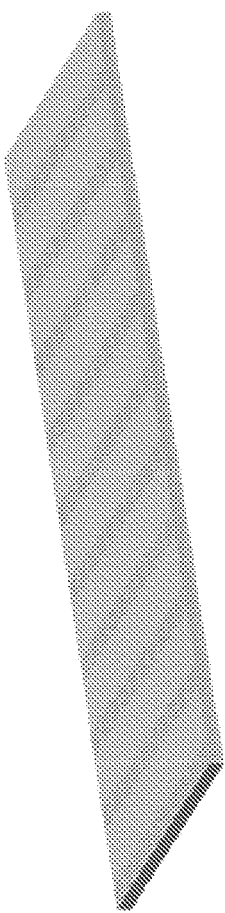
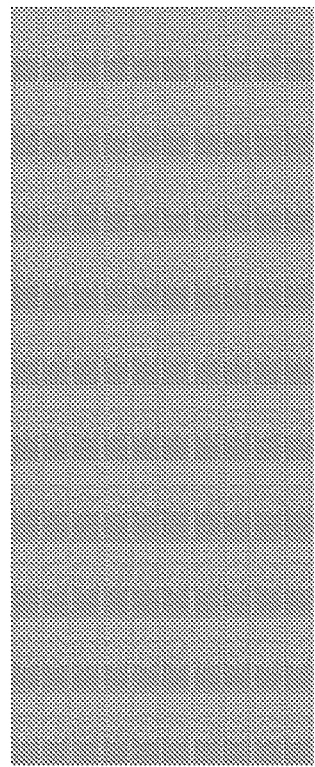
FIGURE 10C
FIGURE 10E
FIGURE 10B
FIGURE 10A
FIGURE 10D

APPARATUS, METHODS AND SYSTEMS FOR SEPARATING PARTICLES FROM AIR AND FLUIDS

CROSS REFERENCE TO RELATED APPLICATIONS

This application is a 35 U.S.C. § 371 national stage entry of PCT/US2016/043922, entitled "Apparatus, Methods and Systems for Separating Particles from Air and Fluids," which has an international filing date of Jul. 25, 2016 and which claims priority to U.S. Provisional Patent Application No. 62/196,686, filed Jul. 24, 2015, entitled "Filter Sheets with Embedded Hollow Vortex Elements"; U.S. Provisional Patent Application No. 62/248,852, filed Oct. 30, 2015, entitled "Filter Embedded with Vortex Elements"; and U.S. Provisional Patent Application No. 62/275,807, filed Jan. 7, 2016, entitled "Self-Contained Miniature Cyclonic Scrubber for Air Cleaning." The disclosure of each one of the above applications is incorporated by reference herein in its entirety.

TECHNICAL FIELD

Embodiments of the present disclosure generally relate to apparatus, systems and methods for reducing unwanted particles from gases, in particular apparatus and systems including large arrays of ultra-miniature cyclones and/or self-contained cyclone or vortex scrubbers, and the methodology of making and using the same.

BACKGROUND

Filtering air for removal of fine particles is important for human health, air quality, and many industrial and mechanical applications. Many indoor ventilation systems include air filters, whose primary role is to capture suspended particles and prevent them from proceeding with the air stream. Such filter, however, may require frequent replacement and may rapidly lose their efficiency as captured dust builds up in the media. Dry cyclonic separators are widely used to separate relatively large particles from an air stream and have a much larger capacity to separate and capture solid particles. However, such dry cyclonic separators are not very effective in separating very fine particles from air, and thus, are not useful for filtering indoor air (e.g., in ventilation systems). Cyclonic scrubbers are known which use the cyclonic separation principle in combination with a water spray to improve the capture of fine particles. However, such scrubbers require a constant supply of water flow, as well as drainage, greatly limiting the usability of such a technique in ventilation systems.

SUMMARY OF THE DISCLOSURE

Embodiments of the present disclosure present vortex devices, systems and corresponding methods of separating particles from an air/gas flow, as well as methods of manufacture. It is a particular feature, of at least some the embodiments of the present disclosure, that a massive array of small-scale vortex/cyclone devices (these terms for the subject disclosure may be used interchangeably, which may also be referred to as vortex separators), are assembled together to form a system (e.g., a "sheet") which can be used as a filter or separator (e.g., to replace current filter devices, and in some embodiments, such filters can be configured with a size and shape to correspond to filters/cartridges presently in use) to remove particles from air flows. Such small-scale cyclones, according to embodiments, are configured with a design, size and shape which under ordinary flow and pressure effect vastly greater centrifugal forces. Accordingly, such embodiments allow for the removal of finer particles entrained in the airflow; for example, particles of average size ranging from about 0.01 µm to about 5 µm, from about 0.1 µm to about 4.5 µm, from about 0.25 µm to about 4 µm, from about 0.5 µm to about 3 µm, from about 0.75 µm to about 2 µm, from about 1 µm to about 1.5 µm, about 1.25 µm, including all values and subranges in between can be removed using the disclosed embodiments.

The extreme miniaturization of the cyclones, according to some embodiments, that enables such small particle separation leads to a commensurate reduction in the flow volume of each cyclone. However, since typical ventilation systems require very large air flows, the small-sized cyclone devices according to embodiments of the present disclosure can be configured and customized in very large monolithic arrays to handle any desired airflow (e.g., a plurality from several, to tens, hundreds, and thousands to millions according to some embodiments). Further, such arrays (as indicated above), configured as a filter/cartridge for various HVAC systems. Thus, a number of such cartridges can be used to handle a certain volume.

Such monolithic arrays of up to thousands (or more) of micro/miniaturized cyclone devices may be manufactured using low cost mass-production techniques, for example, three-dimensional (3D) printing, and vacuum/thermo forming. In some embodiments, such arrays can be made in layers—i.e., certain portions of the cyclone/vortex devices can be part of a one layer, and then the layers assembled into the structure. The noted manufacturing techniques can be used to make such layers.

The captured particles can be held in receptacles attached to the cyclones. The receptacles can be made large enough to continue to clean air for very long durations. Furthermore, the receptacles can form separate removable/replaceable/disposable arrays, either to be cleaned and returned or to be replaced by new receptacle arrays, such that, the cartridge with the arrayed cyclone devices can be used over and over again.

Still other embodiments of the present disclosure are directed to scrubber cyclone devices system otherwise referred to as wet cyclone devices, which can be of any size (though in some embodiments, may be sized to those of the above-noted arrays of small-scale devices). In some of these embodiments, the wet cyclone makes use of a liquid to eliminate (e.g., "scrub") particles out of an airflow, and specifically (in some such embodiments), where the liquid is not water. In some such embodiments, a non-water cleaning liquid can be used. Conventional water based wet-cyclone devices/systems are not suitable for ventilation filtering since (1) water must be separately and continually provided to a cyclone(s) and then disposed of as it is used (requiring plumbing, pumps, drainage, etc.) and (2) water in the wet-cyclone evaporates and effectively humidifies the air—which is undesirable in many situations, e.g. in air-conditioner systems. To overcome these issues, in some embodiments of the present disclosure, a self-contained, passive, wet cyclonic scrubber is configured with an attached reservoir of liquid (e.g., non-water) for cleaning the air and capturing fine particles.

Such scrubber embodiments are designed such that the energy of the incoming air flow can be used to agitate the cleaning liquid, while preventing liquid droplets from escaping with the outgoing air stream. By configuring the cyclone and a corresponding attached reservoir to prevent the escape of liquid, and by choosing a low vapor pressure liquid for the task, the volume of liquid can be maintained for an extended operating time without the disadvantages of conventional cyclonic scrubbers.

According to some embodiments of the present disclosure, systems, devices and methods are described for an air filter device comprising: a sheet of material initially configured in one or more planar sections; a plurality of organized air outlets arranged on the sheet and configured to allow the air to flow through the sheet; a plurality of cyclonic compartments coupled to the sheet, each compartment comprising a cyclonic structure comprising at least one of a cone or a cylinder, including a tangential inlet, and a cyclonic outlet at the end of the cyclonic structure that is coupled to the sheet. In some embodiments, each tangential opening is in air communication with a respective incoming air side of the sheet, and each cyclonic outlet is coupled to a respective outlet of the sheet.

Further, the device may comprise a plurality of receptacles configured for fluid communication with the cyclonic structures, wherein each receptacle is configured as at least a portion of an apex or edge of a respective cyclone structure; the air flow within each cyclone structure is configured to form at least one vortex during airflow through the structure; the formed vortex is configured to separate particles from the air flow; the separated particles are received in the receptacles; and each receptacle may be attached a plurality of cyclone structures. In addition, the device comprises a plurality of hollow tubes and/or cones each having an opening on both ends and configured to extend in an approximately perpendicular direction, relative to a first or a second plane, from each respective cyclonic opening to each respective air outlet, wherein at least the plurality of compartments are configured as a monolith structure; the monolithic structure is configured as a filter element; and the monolithic structure is configured as a cartridge.

In some embodiments, the device further comprises an internal coating or a liquid, wherein the coating or liquid is arranged or introduced within each cone or receptacle and the coating or liquid is configured with adhesive, antimicrobial and/or adsorptive or chemical properties. The device may also include solid particles, wherein the particles are arranged or introduced within the cyclonic structures and/or the receptacles and can serve as sorbents, catalysts or antimicrobials. In some embodiments, a method of manufacturing the above-disclosed filtering device comprises at least one of extruding, molding, casting and layering the devices, wherein the device is manufactured as a monolithic structure. In some embodiments, layering comprises additive manufacturing, wherein additive manufacturing comprises three-dimensional printing. In some embodiments, layering comprises planar manufacturing, wherein planar manufacturing is selected from the group consisting of: thermo-forming, vacuum forming, stamping, sheet processing, lithography, embossing, imprinting, role-to-roll processing or any other suitable planar technique that imparts topographical features.

In some embodiments, the device is manufactured as a plurality of layers, wherein the plurality of layers are concurrently or subsequently aligned and coupled. In some embodiments, the method includes attaching preformed cyclonic structures to a patterned sheet, wherein the air outlets are either preformed or subsequently manufactured after attachments.

In some embodiments, an air filtration subassembly comprising a plurality of the above-disclosed air filter devices comprises a plurality of organized air flow inlets; a plurality of organized air flow outlets; a plurality of compartments, each compartment including a hollow cyclone structure having a base portion including an approximately concentric opening and a tangential opening, and an apex portion; and a plurality of receptacles, each being in air communication with the apex portion; wherein: each tangential opening is in air communication with a respective air inlet, each concentric opening is in air communication with a respective air outlet, and each receptacle is configured as at least a portion of the apex.

In some embodiments, a method of separating particles from an air flow comprising: organizing a plurality of cyclonic filter compartments in a structural array, the array configured with a length, width and thickness suitable for use as a replacement filter or cartridge in an HVAC or ventilation system for occupied spaces, wherein: each compartment includes a hollow cyclonic filter structure having a base portion including a concentric opening and a tangential opening, an optional apex portion, and a receptacle; each tangential opening is configured to receive a portion of an indoor and/or outdoor airflow; the cyclonic portion is configured to form at least one vortex for the airflow, the vortex is configured to separate particles entrained in the airflow; the receptacle is configured to receive the separated particles, and each concentric opening is configured to expel the airflow after being subject to the at least one vortex is disclosed. In some embodiments, each receptacle is configured as at least a portion of the apex.

In some embodiments, an air cleaning device comprising a cyclonic structure in fluid communication with liquid reservoir, wherein: the cyclonic structure comprises at least one of a generally cylindrical and conical cavity with an approximately tangential air inlet and an approximately concentric air outlet, and the liquid reservoir is configured with at least one of an opening or a passage to the cavity to draw a portion of the liquid from the reservoir into the cyclonic structure by the effect of an airflow in the cyclonic structure is disclosed. In certain embodiments the device further comprises at least one additional passage arranged between the cavity and the reservoir and configured to expel at least a portion of the liquid drawn into the cavity and return the expelled fluid to the reservoir. In certain embodiments, the opening/passage allowing liquid to enter the cavity from the reservoir is in proximity to the air inlet or air circulation path, and wherein the device further comprises a second passage comprising at least one opening in the cyclonic cavity wall and is configured to expel liquid from the cavity, wherein the liquid is expelled via at least one of centrifugal force, gravity and pressure differentials. In some embodiments, the liquid has a vapor pressure that is at least 50% lower than that of water at ambient temperature. The liquid may be at least one of silicone or mineral oil. In some embodiments, the liquid includes additives comprising at least one of antimicrobials, catalysts, surfactants, solvents, salts, stabilizers, dyes. In some embodiments, at least a part of the liquid reservoir is located below the base of the cyclonic structure and is configured to receive a substantial part of the liquid of the cyclonic structure in the absence of air flow, wherein the interior walls of the cavity includes at least one of a plurality of protrusions, features and a textured surface, and wherein the plurality of protrusions, features and/or textured surface is configured to facilitate the formation of an aerosol of the liquid or turbulence in the cavity.

In some embodiments, an air filter system comprising a monolithic array of cyclonic elements wherein each element includes a cyclonic cavity with a substantially tangential air inlet and a substantially concentric air outlet is disclosed. The array forms a sheet configured with a majority of the inlets arranged on one side of the sheet and a majority of the outlets on the other side of the sheet; each element is in fluid communication with a liquid reservoir, wherein the elements are configured such that the flow of incoming air in each element draws liquid from the reservoir to circulate in the cavity and come into contact with the air flow. Further, the system comprises an additional liquid passage arranged between each cyclonic cavity and a corresponding reservoir, the additional liquid passage configured to expel a portion of the circulating liquid cavity and return such liquid to the reservoir, wherein the liquid is initially included with each element before use or prior to assembly of the system. The system also includes a removable film or a seal arranged for coupling to at least one side of the sheet to restrain liquid during transport.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

FIGS. 2A-B show example illustrations of a vortex separator with a plurality of connections to a reservoir and configured for capturing suspended particles in a gas/airflow, according to some embodiments;

FIGS. 9A-B show example illustrations of another vortex separator configured for capturing suspended particles in a gas, according to some embodiments; and FIGS. 10A-I show example illustrations of an alternative vortex separator and an array of a monolithic sheet of air scrubber formed from the said vortex separator, according to some embodiments.

DETAILED DESCRIPTION

In some embodiments, cyclone or vortex scrubbers may be used as a mechanism for removing suspended solid particles (e.g., contaminants) from a gas (e.g., indoor air). Gas (e.g. indoor air) injected into a container such as, but not limited to, cylindrical or conical containers may be guided to flow tangentially along the edge (i.e., circular along the wall when spiraling down) of the container. In some embodiments, the gas may then exit the container perpendicularly, for example, along the central axis of the cylinder or cone. When circulating inside the container, the entering gas can form a vortex or a cyclone, wherein the centrifugal force pushes some or all the suspended particles towards the edge, and the exiting gas leaves the container with a reduced amount of suspended particles.

In some embodiments, a scrubbing liquid (e.g., non-water, according to some embodiments) may be included, whereby the liquid droplets come into contact with the air within the vortex separator. The droplets can capture fine particles and molecules from the gas, and the centrifugal force pushes the droplets to the inner walls of the container, after which the droplets (containing solid particles such as the contaminants) are reused.

In some embodiments, the container may include a reservoir configured to contain the scrubbing liquid, which may then serve as a source of liquid droplets when the vortex or cyclone forms. The reservoir may be the bottom of the cyclone scrubber or may be a separate reservoir coupled to the scrubber via one or more openings. The reservoir may also serve to collect droplets after the capturing of the suspended solid particles.

In still other embodiments, the liquid may be supplied in a continuous manner during the operation of the cyclone or vortex scrubber (i.e., not reused), and such constant or continuous supply may be provided by a mechanism that includes at least a source of the liquid, a pump that forces the liquid through nozzles into the cyclone, and a drain assembly to collect the spent liquid.

Figures 1A, 1B:
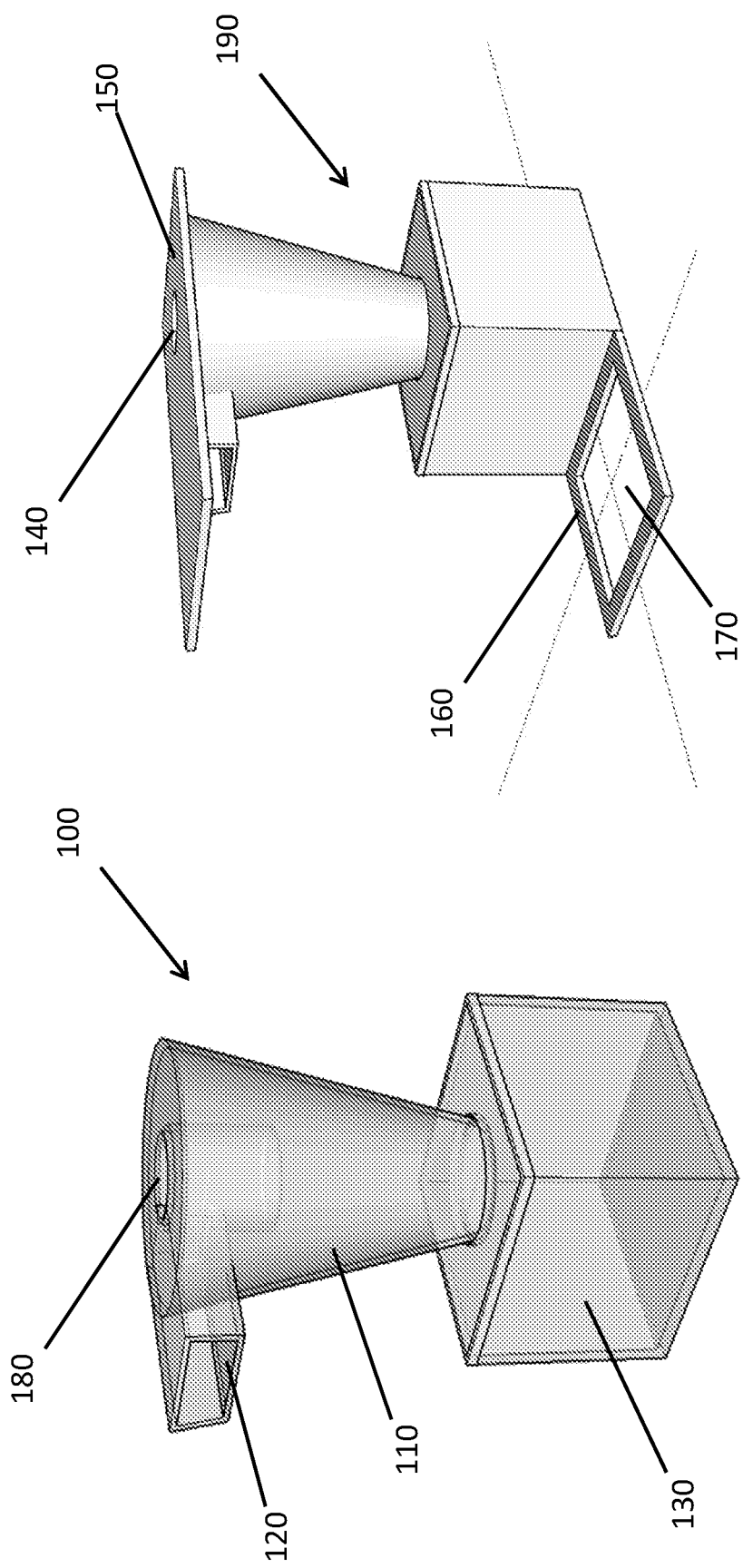
FIGS. 1A-E show example illustrations of a vortex separator configured for capturing suspended particles in a gas/airflow, according to some embodiments.

With reference to FIGS. 1A-E, in some embodiments, example illustrations of a vortex separator 100 configured for capturing suspended particles in gas are depicted. FIG. 1A shows a vortex separator 100 including a vortex chamber 110 configured to facilitate the formation of a vortex, a fluid inlet 120 and a reservoir 130. Although FIG. 1 shows the vortex chamber 110 as cone-shaped, the vortex chamber 110 can have a variety of shapes that are configured to cause the formation of a vortex when a gas enters the vortex chamber via the inlet 120 and swirls around an axis of the vortex chamber 110. For example, vortex chamber 110 can be a cylinder, or any other vortex chamber with cylindrical symmetry, i.e. a circular inner surface that allows the gas to rotate about a length-wise (vertical) axis and lead to formation of a cyclone or vortex. In some embodiments, the vortex chamber may be a cone, a cylinder, or a piecewise combination thereof (i.e., a combination of concentric, spliced cone and cylinder sections). In some embodiments, the top section of the cyclone may be cylindrical, below which may be a truncated cone, followed by another cylinder. In one embodiment, the top section of the cyclone is cylindrical, below which is a truncated cone, followed by another cylinder. In FIG. 1A, gas can enter the hollow cone-shaped vortex chamber 110 through the fluid inlet 120, where it then circulates inside the vortex chamber 110, forming a cyclone, before exiting through the outlet 180. The fluid inlet 120 may be located on the tangential side of the scrubber 100 at any desired location, including anywhere on the top along the lip of the vortex chamber 110. It can also be located anywhere on the tangential side of the vortex chamber 110 but below the top rim. Prior to exiting, particles suspended in the gas may be separated out from the gas and settle down;

as such, the gas exiting via outlet 180 may contain less suspended particles than the gas entering through fluid inlet 120. For example, as the air circulates, particles may experience a centrifugal force that hurls them towards the inner wall and downwards to the bottom of the vortex chamber 110, where a hollow receptacle or reservoir 130 configured to capture the precipitating particles may be located. In some embodiments, the vortex separator 100 may not be coupled to a reservoir 130 and instead the bottom of the vortex chamber 110 may serve as a receptacle of precipitating particles.

For effectiveness, convenience, efficiency, cost reasons, etc. (at least one of the foregoing), one may wish to substantially reduce the size of the vortex separator 100 while still maintaining a desired level of performance from the vortex separator 100 in terms of treating large air volumes and removing fine particles suspended in the air. An important reason to miniaturize the diameter of the cyclone is to enable separation of fine particles by achieving substantial higher centrifugal forces. The centrifugal force associated with circular motion for a particle of mass m is given by $F_c = mv^2/r$ where v is the velocity of the particle, i.e., the local velocity of the gas in the vortex chamber 110, and r is the radius of the circular path. As such, when the velocity v increases, particles suspended in the swirling gas are pushed away from the center axis of the circular path towards the edge, i.e., towards the inner surface of the vortex chamber 110, leading to the precipitation of these particles towards the bottom (e.g., reservoir). In some embodiments, the magnitude of the velocity may be determined based on available infrastructure that generates desired driving pressure which in turn will determine the flow velocities inside the cyclones. The pressure available in ventilation systems is typically in the range of 10-2500 pascals (Pa), equivalent to 0.04"-10.0" water gauge (inches WG) and more typically between 100-500 Pa. (0.4"-2"). Velocities ranging from about a few hundred to about a few thousand meters per minute may be generated using fans, blowers, etc. The magnitude of the velocities may range from about 200 m/min to about 5000 m/min, from about 400 m/min to about 4000 m/min, from about 500 m/min to about 2500 m/min, from about 750 m/min to about 1500 m/min, about 1000 m/min, including all values and sub ranges in between.

An alternative way of increasing the centrifugal forces to separate out and remove suspended fine particles can be reducing the circular path radius r; in other words, reducing the size of the vortex chamber. The amount of the reduction in the size of the vortex chamber may depend on the size of suspended particles one wishes to remove from the swirling gas. For example, sub-micron particles (i.e., particles with average size (size measured in terms of radius, diameter, width, or other linear dimensions) of less than about a micron)) may be isolated and captured by vortices with diameters below about 1 cm. As such, suspended particles of size in the micron or sub-micron range (e.g., less than about 5000 nm, less than about 2500 nm, less than about 1000 nm, less than about 500 nm, less than about 250 nm, less than about 100 nm, less than about 50 nm, less than about 10 nm, including all values and sub ranges in between) may be isolated and collected by a vortex separator 100 and/or a vortex chamber 110 with diameters less than about 10 mm, less than about 5 mm, less than about 3 mm, and less than about 1 mm, including all values and sub ranges in between.

Figure 3B:
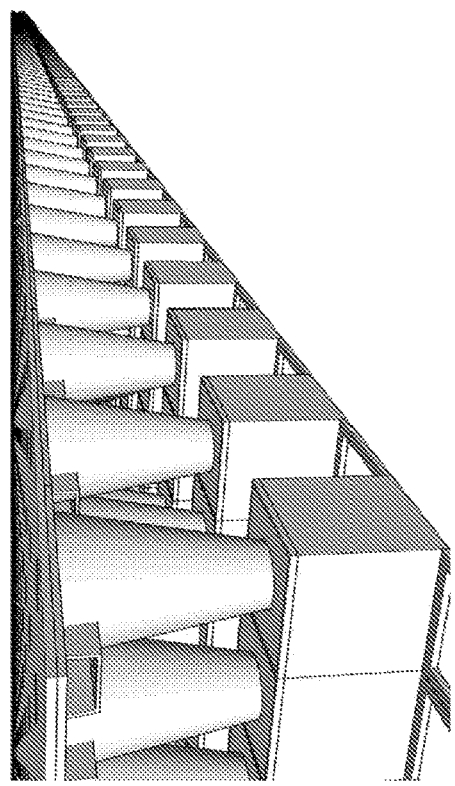
FIGS. 3A-K show example illustrations of a monolithic sheet containing an assembled array of vortex separators configured for capturing suspended particles in a gas/airflow, according to some embodiments.
Figure 3A:
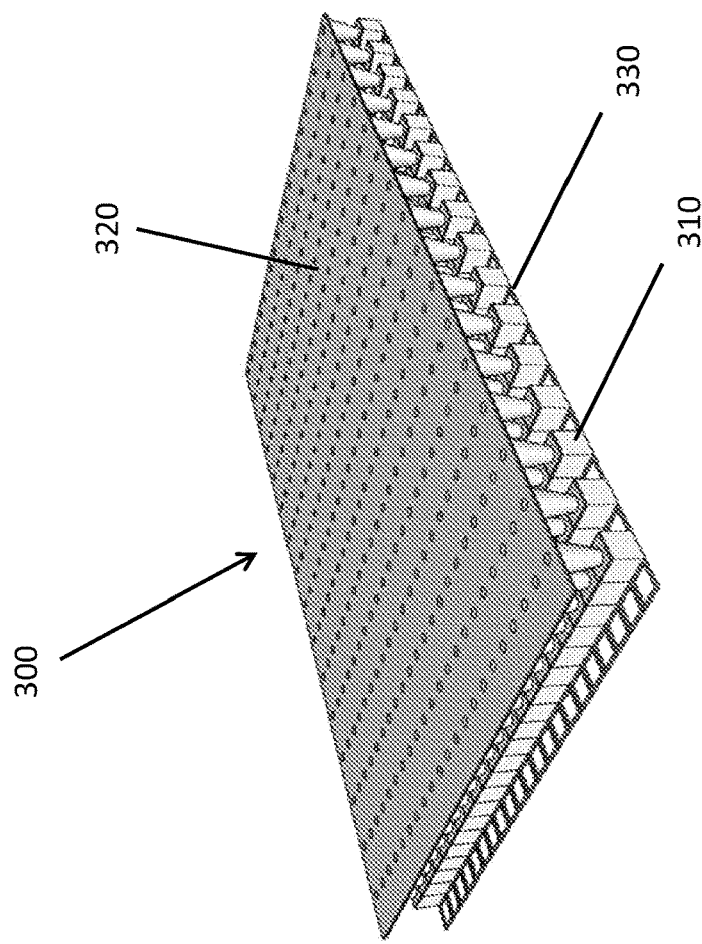

It is instructive to consider the actual centrifugal force in systems according to at least some embodiments. For example, with a 1 millimeter radius (2 mm diameter), and a velocity of 10 m/s, the centrifugal force is approximately $10^5$ m/s$^2$ which is about 10,000 g (g being the gravitational acceleration). Such a radius has the further advantage of a shorter drift distance to carry the particles to the inner wall where they are collected. miniaturization represents a key feature and dramatic change in the applicability of vortex separation for fine particles in at least some of the embodiments of the present disclosure. While individual vortex chambers (according to some embodiments) generally carry a much smaller gas throughput (e.g., with flow throughput reduced by a factor of $r^2$, a 1 mm vortex may have only a 1/10,000 of the air flow of a 10 cm vortex), required flow rates for typical ventilation systems can be addressed arranging a large plurality of the vortex separators together. Such a configuration of vortex separators can service a much larger gas throughput while maintaining or even increasing the efficiency of suspended particle separation. For example, FIG. 1B shows a vortex separator 190 that is configured to be used as a geometric unit cell for forming a sheet of a massive plurality of vortex separators; examples of such sheets are shown in FIGS. 3A-B. The vortex separator 190 is similar to the vortex separator 100 of FIG. 1A, but may also contain a bottom surface 160 that includes an inlet 170 configured to allow gas into a cyclonic scrubbing system comprising the plurality of vortex separators 190. Inlet 170 is required, in some embodiments, when a plurality of such separators and arranged side by side, as shown in FIG. 3A-B. The inlet 170 may be shaped and sized so as to facilitate the flow of gas into the cyclonic scrubbing system for efficient scrubbing of the gas. For example, the inlet may be circular, rectangular, square-shaped, etc., and may have a linear dimension (e.g., radius, diameter, width, etc.) ranging from about 1 mm to about 10 mm, from about 2 mm to about 8 mm, from about 3 mm to about 7 mm, from about 4 mm to about 6 mm, and about 5 mm, including all values and sub ranges in between. In other embodiments, the linear dimension may be less than 1 mm. In some embodiments, the vortex separator 190 may also include an upper surface 150 that includes an outlet 140 configured to at least partially align with the outlet 180 of the vortex separator 100. The inlet may not be required if there is no bottom sheet or if there is a gap between a cyclone and its neighboring cyclones at least on one of its sides, as seen for example in FIG. 3E or 4A.

In some embodiments, one may configure a monolithic sheet-like structure capable of treating a large gas throughput by arranging a massive array/plurality of vortex separators 190 in a repeated (and optionally periodic) manner using one or more of the vortex separators 190 as a geometric unit cell. In such embodiments, incoming air impinges on one side of the sheet of scrubbers and treated gas exits the scrubbers on the other side of the sheet, via outlet 140/180 after removal of some or all of the suspended particles in the entering gas. The removed particles may be collected in the receptacle or reservoir 130. In some embodiments, the sheet of scrubbers may be arranged in such a way that one or more of the reservoirs may be in fluid communication with each other so as to allow transport of the collected particles in between reservoirs (e.g., via conduits). In some embodiments, such as FIGS. 3I-3K a plurality of the vortex chambers 110 may share one or more reservoirs 130, in some cases divided by separators (not shown) to maintain an even distribution and/or settling of the suspended particles to be collected therein. Reservoirs can be shared by a plurality of vortex separators that are connected into a monolithic array and are configured as parallel fluid flow elements. For example, a hollow particle chamber may be formed at the bottom of the vortex chambers 110 so that particles fall into the chamber through an opening at the bottom of the vortex chambers 110. The particle chambers of multiple cones can then be connected to form a larger common particle receptacle (or "dust bin") space, (see for example FIG. 3K). In some embodiments, the particle receptacle can become an entire hollow layer. In other embodiments the particle receptacle can be partitioned or interrupted with walls, e.g. to facilitate the settling of the particles (FIG. 3H) or it can be configured to be replaceable. In some embodiments, the reservoirs/receptacles may be separable or removable from the main body (i.e., vortex chambers 110) of the vortex separators 100. In some embodiments, the reservoirs/receptacles may be accessible without necessarily being separable from the main body (i.e., vortex chambers) of the vortex separators, thereby allowing the removal and/or replacement of contents (e.g., solid or liquid agent materials as discussed below, etc.) of the reservoirs/receptacles while the reservoirs/receptacles are still part of the vortex separators. When the reservoirs are full or the reservoir agent materials are to be replaced, the main cyclones can still be reused.

In some embodiments, the disclosed vortex separators 100, 190 may be arranged in a repetitive (in some cases periodic) manner so as to form a filters sheet. A plurality of the vortex separators of FIG. 1B can be arranged into a dry filtration sheet that allows gas with suspended solid particles to flow through the sheet via the plurality of inlets 170 (or between the forest of cyclones in FIG. 3E), followed by a flow into the plurality of vortex separators 190 through the vortex separator inlets 120, before the filtered gas is finally released on the other side of the filtration sheet through the outlets 140. The suspended particles that are isolated and captured from the gas as a result of the centrifugal forces of the vortex in each vortex separator can then settled into the bottom of the vortex separators or a receptacle or reservoir 130 coupled to the separators. Accordingly, such sheets serve as filtration devices as the sheets receive contaminated gas and release cleansed gas (i.e., gas with less contamination that the received one). Example embodiments of dry filtration sheets comprising a plurality of vortex separators 190 arranged in a repetitive manner so as to form a large filtering structure are shown in FIGS. 3A-B. As an illustration, the filtration sheets of FIGS. 3A-B can be made to be closed, i.e., gas is allowed to enter the sheet through the inlets 350 only (contaminated gas) and leave through the outlets 340 (cleansed gas), as such, serving as a large, closed passive dry filtration system. In some embodiments, the filtration sheet can be a single monolithic structure, or it may comprise a plurality of monolithic sheets where at least one sheet comprises more than a single vortex separator.

The number of vortex separators in a sheet can be large, especially with modern manufacturing techniques. For example, if the vortices are in an array spaced 5 mm apart, then a flat, 1 m$^2$ (square meter) sheet will have 40,000 elements. If the spacing is 2 mm, a square meter sheet will have as many as 250,000 vortices. In the sub-millimeter spacing, the vortex count per square meter is in the millions. By reducing the size of each constituent vortex separator, one may enhance at least the filtration capacity of a filtration sheet without significantly increasing its size.

Figure 1E:
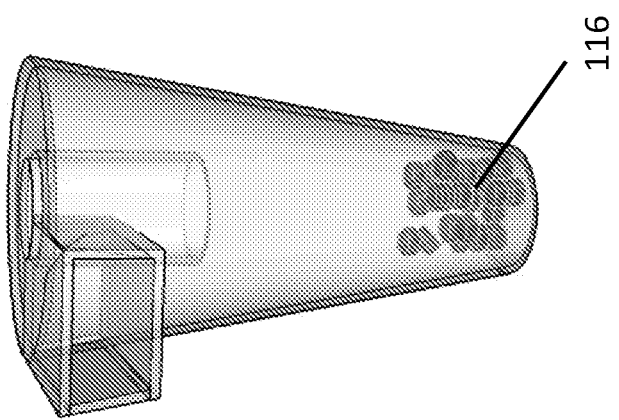

In some embodiments, for example with reference to FIG. 1E, solid agent materials 116 (which may also be referred to as particles or filtration particles) configured to enhance the air cleaning performance may also be included at the bottom of the vortex separator and/or in the reservoir of a vortex separator. These particles may comprise catalysts, sorbents, antimicrobials, detergents, and the like.

In some embodiments, the capture of fine particles in a vortex/cyclone separator includes a liquid agent that forms a spray or an aerosol inside the cyclone, which can capture fine particles. Such embodiments in the present disclosure are referred to as a wet cyclonic scrubber system (which may simply be referred to as a wet scrubber or wet cyclonic scrubber—all such terms may be used interchangeably). In some such embodiments, a plurality of the vortex separators of FIG. 1B can be arranged into a wet cyclonic scrubber configured to scrub contaminated gas using liquids. As mentioned above, in some embodiments, such liquids may be supplied during the operation of cyclone or vortex scrubbers via an external supply mechanism and/or infrastructure (e.g., including one or more of a source of the liquid, pumps, nozzles, drain assemblies, and/or the like).

Figure 1D:
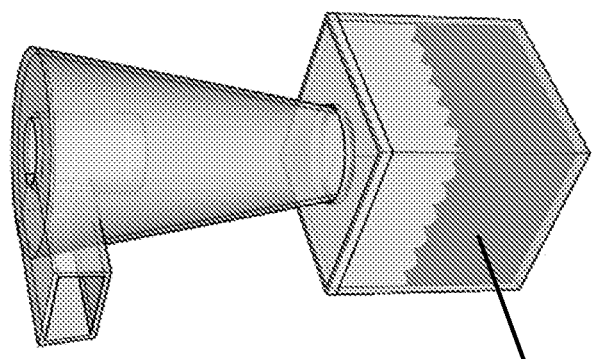
Figure 1C:
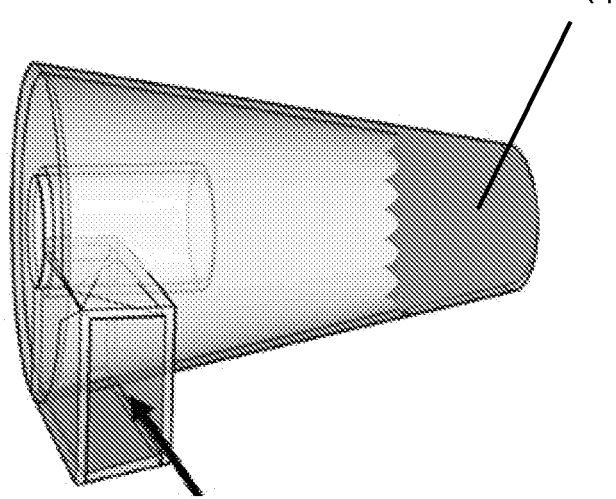

In some embodiments, a self-contained, "passive" wet cyclonic scrubber including scrubbing liquids but comprising no external liquid supply infrastructure such as a source, a drain, a pump, etc., and effects a "closed loop" system. FIGS. 1C and 1D show examples embodiments of vortex separators including scrubbing liquids 112 in at least a portion of the vortex chamber 110 (e.g., bottom section of the cone of the vortex separator) and some or the entire reservoir, respectively.

In embodiments, where the scrubbing liquid 112 is not supplied by external liquid supply infrastructures the cyclonic scrubber may be in the form of a self-contained "passive" element and may rely on externally induced air flow to activate the cyclonic scrubbing action. For example, a self-contained cyclonic scrubber may comprise a passive cyclonic vortex chamber with a tangential inlet and an axial outlet, with a scrubbing liquid reservoir in fluid contact with a flowing contaminated gas (e.g., air flow containing suspended particles), and configured such that the externally induced air flow in the cyclone lifts and carries at least some of the scrubbing liquid and produces a liquid stream or an aerosol that serves to capture and separate particles suspended in the gas. One major advantage of such embodiments is that little or none of the scrubbing liquid 112 is taken out of the wet cyclonic scrubber (in contrast to most systems that supply scrubbing fluid externally). In other words, during the operation of the wet cyclonic scrubber, the same scrubbing liquid 112 may be used repeatedly by recycling the liquid that is lifted and aerosolized to return and mix in the reservoir in a continuous fashion. This is because when the liquid droplets come into contact with the contaminated gas (e.g., such as air or fluid containing suspended particles), the particles are captured by the droplets, and the droplets are pushed towards the outer wall by the centrifugal force (and eventually returned to the reservoir) while the treated gas emerges from the outlets 140 or 180 of the cyclonic scrubber. As such, scrubbing liquid 112 may be continuously available without the use of conduits, pumps and valves, as well as an endless source, that would otherwise be required to replenish the liquid. This may serve to reduce or entirely eliminate the need to replenish the scrubbing liquid 112, as the liquid volume may be substantially preserved as the droplets are separated by the centrifugal forces in the cyclone. In such embodiments, not only is the need for liquid plumbing and pumping infrastructure eliminated, but also enables the use of liquids that are not water and would otherwise be too expensive to continually replenish.

In some embodiments, the choice of the scrubbing liquid 112 in wet cyclonic scrubbers and/or solid agent materials 116 in dry filters configured to enhance filtration performance may depend on factors such as but not limited to the type of suspended particles to be removed from the flowing fluid, temperature and pressure of the surroundings, desired properties for the contaminated gas and released from the vortex separator (e.g., its humidity, etc.). In some embodiments, an air cleansing system may contain both scrubbing liquids and a solid agent material. For wet cyclonic scrubbers, in some embodiments, water can be a suitable liquid. In others, the natural evaporation of the water may limit its usefulness in a non-replenished reservoir. In some embodiments, the water (or any other liquid) can be enhanced with detergents, surfactants, antimicrobials, catalysts, dyes, salts, solvents or any other additive, whether soluble or not. In some embodiments, liquid evaporation may reduce the volume over time, but this can be minimized by using a low-vapor pressure liquid such as mineral oil or silicone, instead of or in addition to water. In some embodiments, a liquid whose vapor pressure at the ambient temperature is significantly lower than that of water may be chosen as a scrubbing liquid. For example, liquids with vapor pressure at ambient temperature in the range of from about 0.0001 torr to about 10 torr, from about 0.001 torr to about 1 torr, from about 0.01 torr to about 0.1 torr, including all values and subranges in between, may be used as scrubbing liquid. One can also use most oils and silicones that have low vapor pressures. For example, many oils have vapor pressures less than about half of water, with many having vapor pressure well below 10 torr, below 1 torr, below 0.1 torr, and even as low as 0.00001 atm. Examples of fluids that can be used as scrubbing liquid include mineral oil, silicone oil, and vegetable oil. Examples of silicones that can be used as scrubbing liquid include PSF-5cSt Silicone Fluid, which according to the manufacturer may have a vapor pressure of 1 torr at 25° C. and PSF-50cSt Silicone Fluid, which has even lower vapor pressure (both silicones from Clearco Products Co. in Willow Grove, Pa.). Although the use of oils and silicones as scrubbing liquid may be more expensive than water, the closed system that allows for recycling the scrubbing liquid makes their use far more economical. An additional advantage is that unlike water, oils and silicones may not release humidity into the air, which may be desired in applications where one wishes to control the humidity such as air conditioning. In some embodiments, the scrubbing liquid may contain no water at all. In some embodiments, the scrubbing liquid may contain water in a small amount compared to other liquids, such as the aforementioned oils, silicones, etc. For example, the fraction of water in the scrubbing liquid may be less than about 1%, less than about 2%, less than about 3%, less than about 4%, less than about 5%, less than about 10%, less than about 15%, less than about 20%, less than about 25%, and/or the like of the total volume of the scrubbing liquid.

In some embodiments, for wet cyclonic scrubbers and/or dry cyclone filters, the vortex chambers 110 such as the cones or the particle receptacles 130 may be internally coated, charged or partially filled with solid agent materials 116 and/or liquid agent materials 112 that enhance the filtration performance. In one embodiment, the coating or liquid may be material with adhesive or antimicrobial properties to improve capture and retention of fine particles and microbes. In another embodiment, a liquid may be placed within the inner surface of the vortex chamber 110 (e.g. cavities) so as to form a film on the sidewall or a spray or an aerosol when the cyclone is active, so that the aerosol particles improve the capture and retention of fine particles. An liquid with low vapor pressure and good stability can provide long term enhancement of the filtration performance. In the case of vortex chambers 110 charged with a liquid agent, the agent may be recharged once it is depleted, consumed or otherwise requiring replacement. The recharging can be facilitated by opening, or recharging ports, appropriately configured in the wall of the vortex chambers 110.

One useful application of such embodiments may be for gas-gas separation. For example, in some embodiments, a liquid solvent may be introduced into each vortex chamber 110 where, once excited into a mist due to a vortex in the chamber, the liquid droplets can act to dissolve certain species of molecules in the gas. In other embodiments, solid agent materials 116 such as adsorbent particles can be placed inside a vortex chamber 110 that can serve to selectively capture targeted gas species, examples of such sorbents including activated carbon, molecular sieve, silica, clay, alumina and/or any other suitable solid sorbent. In some embodiments, the sorbent particles may be attached to the inner surface of the vortex chamber 110, and be lifted to form a fluidized bed. Examples of species targeted for removal from a fluid stream include dust, pathogens, contaminants, allergens, and/or the like. For example, the disclosed vortex separator may be designed to specifically remove such species, either entirely mechanically (i.e., using the cyclone effect where the species are captured and precipitated by the aerosolized droplets of a scrubbing liquid) and/or aided by the presence of chemically active antimicrobial liquids or solids trapped in the vortex or on the inner surfaces of vortex chambers 110.

With reference to FIGS. 2A-2B, in some embodiments, the vortex chamber 110 of a vortex separator 200 may be in fluid communication with a reservoir 210 via a plurality of openings or connections. The fluid communication can be facilitated by appropriate openings, for example at the bottom tip or along the upper rim of the vortex separator 200, or anywhere along its cylindrical or conical surface. For example, when there are two conduits, one conduit may serve as an entry conduit 205 for letting in the scrubbing liquid contained in the reservoir 210 into the vortex chamber 220, while the other conduit may serve as an exit conduit 207 to allow the liquid used to capture suspended particles (of contaminated gases) back into the liquid reservoir 210. In this type of configuration, continual circulation of the scrubbing liquid may be induced by the flow of the contaminated gas. The contaminated gas containing suspended particles may enter the vortex chamber 220 through the inlet 201, create a cyclone 206 while circulating along the inner walls of the vortex chamber 220, and then exit via an outlet 202. The scrubbing liquid from the reservoir 210 may enter the cyclone cavity through the lower connection or conduit 205, where it may be induced to circulate as shown by arrow 206 due to the vortex created by the gas containing the suspended particles. While circulating, the scrubbing liquid may then rise from the entry conduit 205 to the exit conduit 207, while also being pushed towards the walls of the vortex chamber 220 by the centrifugal force due to the circular motion. When it reaches the top of the cavity, it may then be pushed out and back and enters (208) into the reservoir 210 where it mixes with the rest of the reservoir liquid and eventually flows back into the entry conduit 205. As such, the continual flow of the scrubbing liquid from the reservoir 210 through the entry conduit 205 to the vortex chamber 220, followed by a flow back into the reservoir 210 through the exit conduit 207 occurs as long as there is gas flowing into the vortex chamber 220 through the inlet 201 and flowing out through the outlet 202 after forming a vortex in the vortex chamber 220.

In such embodiments, the liquid may be recycled for an extended period of usage without replacement, leading to a gradual build up in the reservoir 210 of particles and contaminants captured by the scrubbing liquid and immersed or dissolved in it. As the concentration of particles/contaminants in the scrubbing liquid increases, the concentration may eventually reach a point where the scrubbing liquid's desirable cleansing properties or flow properties may be compromised. In such cases, one may remove and recharge the scrubbing liquid (alternatively, or in addition, the entire cyclonic element may be replaced). Depending on the cost of production of the vortex separators, the latter may be easier and more cost effective in many situations. The useful lifetime of the scrubbing liquid may depend on the amount of contaminants captured as well as the total amount of scrubbing liquid and other solid and/or liquid agent materials in the reservoir 210. In general, the higher the concentration of particles in the incoming fluid/air stream, the faster the buildup of captured particles in the reservoir 210 would be. The fluid/air flow, pressure differentials, air-liquid friction and the liquid properties may all contribute to the dynamics of this fair-liquid cyclone. Gravity may also play a role, notably in terms of influencing the flow of liquid into and out of the reservoir 210, as well as the flow of liquid and aerosol inside of the vortex chamber 220.

With reference to FIG. 2B, in some embodiments, cyclones are typically positioned vertically so that gravity ultimately acts to collect and maintain the separated particles at the bottom of the vortex separator 200 or in a receptacle placed at the bottom of the vortex separator 200. For example, when a sheet is formed from a plurality of vortex separators 200 arranged in some repeated and periodic fashion, the orientation of the vortex separators 200 relative to the overall planar sheet may be perpendicular, or it may be tilted away from the perpendicular. In certain embodiments, one may position the vortex separator 200 horizontally or at least tilted substantially towards a horizontal orientation. The tilt angle can range, measured from the perpendicular (vertical) direction, from about 0 degrees to about 90 degrees, from about 0 degrees to about 30 degrees, from about 30 degrees to about 60 degrees, from about 60 degrees to about 90 degrees, including all values and sub ranges in between. A horizontal orientation (about 90 degrees tilt angle) of vortex separators 200 within a sheet (i.e., a plurality of vortex separators as shown in FIGS. 2A-B, for example) allows, in some embodiments, for the sheet itself to be standing vertically, which may be the preferred configuration if the incoming air steam is horizontal.

In some embodiments, the vortex separator 200 may be positioned lying down, i.e., the cylindrical axes are oriented approximately along their common plane of the filter sheet, with the tangential entry inlets all opening to one side of the plane and the axial outlets leading to the other side of the plane. This may be referred to as "in plane" cyclone sheets, in contrast to the perpendicular vortex separator sheets. More generally, the orientation of the vortex separator 200 to the plane can be any angle from perpendicular to parallel. As will be discussed in more detail below, pleating can be applied to in-plane cyclone sheets to achieve the benefits of pleating, for example with vertical pleat lines. In this configuration, all vortex separators 200 have the same orientation without requiring inverted cyclones or blank sections. Other ways to shape and form the entire sheet are possible. In one embodiment, the sheet itself can be formed into a vertical cylinder, with in plane cyclones; this configuration allows the cylinder to serve as a cylindrical filter, with air entering axially along the inside of the cylinder and exiting radially. It can be applied in combination with vertical pleating. This macro-cylinder formed from a large sheet of vortex elements does not correspond with the small cylinders that may form each of these vortex elements.

In some embodiments, the tilting of vortex separators 200 may also facilitate the interaction of solid or liquid agents with the vortex formed in the vortex chamber 200. For example, in the case of a vortex separator 200 charged with liquid or solid agents (i.e., the inner surfaces of the vortex chamber may include liquid or solid agents configured to facilitate the capturing and isolation of suspended particles such as dust, contaminants, etc.), the horizontal orientation can serve to prevent the agent material from settling at the bottom of the cyclone and thereby reducing its interaction with the air flowing through the cyclone. The tilt of the vortex separator 200 causes the agent material to settle along the lower edge of the cyclone as opposed to its lower tip, and the circulating gas acts to continually lift and redistribute the agent—whether liquid or granular—and increase its interaction with the air. For example, a tilted angle (with respect to vertical or lengthwise axis of the vortex separator 200) ranging from about 5 degrees to about 75 degrees, from about 15 degrees to about 60 degrees, or about 30 degrees to 45 degrees, including all values and sub ranges in between, may enhance the interaction of liquid and solid agents with the vortex formed by the swirling gas.

As discussed above, miniaturized vortex separators allow for efficient separation of suspended particles from circulating gas. Miniaturizing the vortex separators, as also noted above, however, may lead to reduction in capacity of the scrubbers, i.e., small vortex chambers may carry much smaller gas throughput. One solution to increase capacity may be to arrange a plurality of miniature vortex separators into large sheets that are capable of handling a desired amount of large gas throughput, while still employing the enhanced cleaning or filtering capabilities of miniaturized scrubbers or filters to separate out suspended particles from the gas. As such, to overcome the small throughput capacity of miniature vortex scrubbers/vortex chambers including cones, cone-like structures or cylinders (which may be referred to as cyclonic structures), a very large number of parallel cyclones can be configured so that the aggregate air flow meets the needs of the system. For example, if the cyclone scrubber ports are millimeter scale and the air velocities are within the same range as those in a 1000 cubic feet/min (CFM) cyclone, the number of such miniature cyclones may have to be in the order of $10^5$-$10^6$ or more, to achieve comparable total air flow. In some embodiments, the number of miniaturized cyclones may be in the range of from about $10^2$ to about $10^8$, from about $10^3$ to about $10^7$, from about $10^4$ to about $10^6$, about $10^5$, including all values and sub ranges in between.

FIGS. 3A-K show example embodiments of an assembly of large numbers of miniature cyclones or vortex separators based on producing a monolithic sheet 300 that is structurally configured to contain miniature vortex separators (generally referred hereafter as cyclone-forming structures 310), using planar manufacturing technology, 3D printing, injection molding, and/or the like. In some embodiments, the sheet 300 comprises a repetitive geometric pattern of contiguous cells (which may be identical) forming a two dimensional rectangular array. Although FIGS. 3A-B show the miniature cyclone-forming structures 310 arranged in identically periodic or repetitive manner, it is to be noted that any arrangement of cyclone-forming structures 310 to form the monolithic sheet 300 can be used. For example, a sheet may comprise some cyclone-forming structures 310 that are oriented vertically relative to the plane of the sheet/array, while others are oriented horizontally, or can be tilted at any angle. Further, the spacing between cyclone-forming structures 310 can be variable within a monolithic sheet, i.e., the arrangement of the cyclone-forming structures 310 may be aperiodic (e.g., some regions of the sheet 300 may have periodically arranged cyclone-forming structures 310 while others are sparse or contain none). In some embodiments, each cyclone-forming structure 310 may be a millimeter-scale vortex separator, and the entire sheet 300 may be cut to any desired size to be used as a planar air filter. In some embodiments, the sheet 300 may not be monolithic but may comprise a plurality of monolithic sheets 300.

Figure 3D:
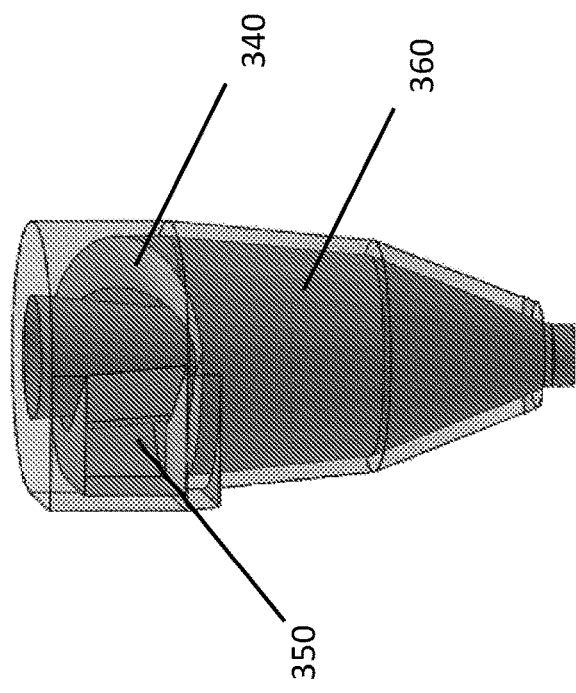
Figure 3C:
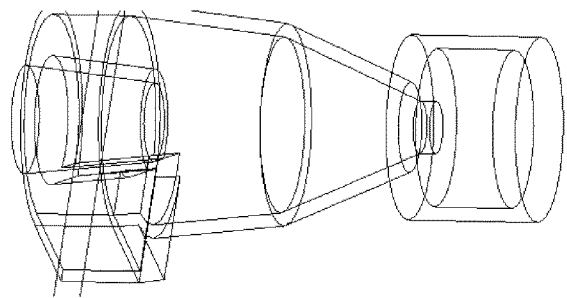
Figure 3E:
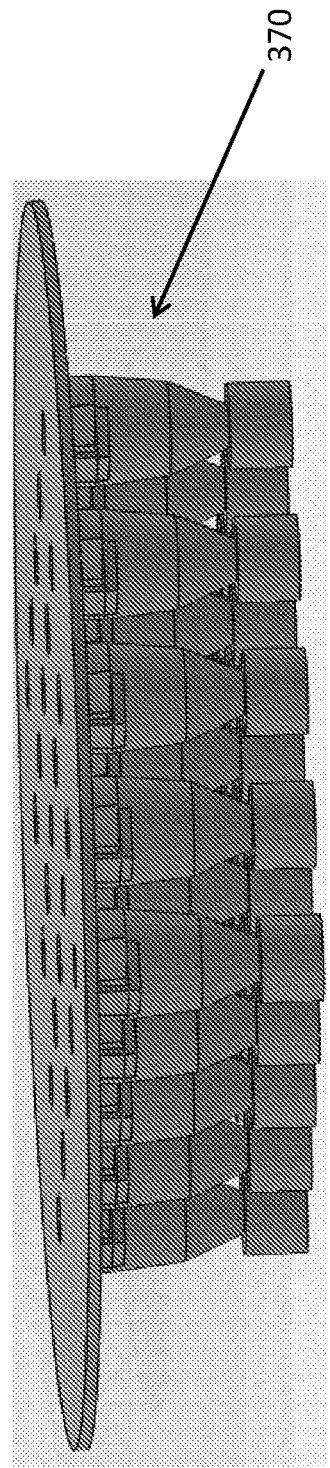
Figure 3G:
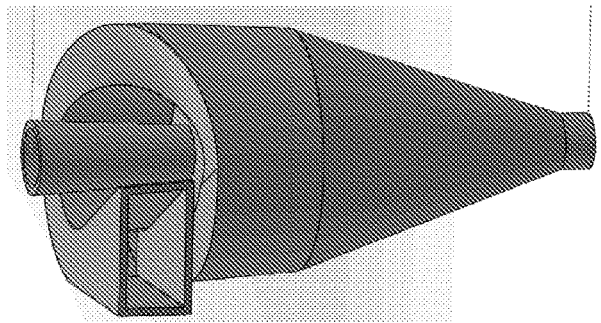
Figure 3F:
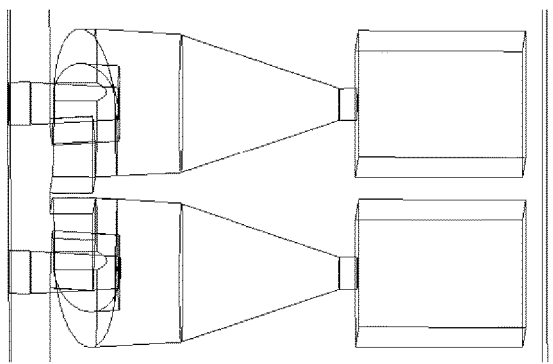
Figure 3H:
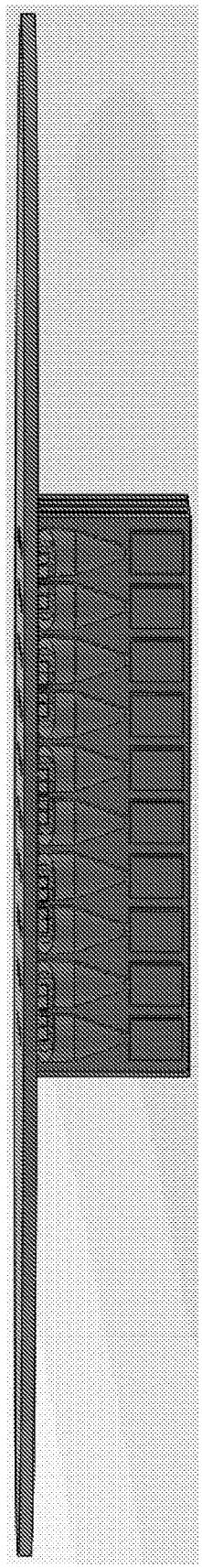
Figure 3J:
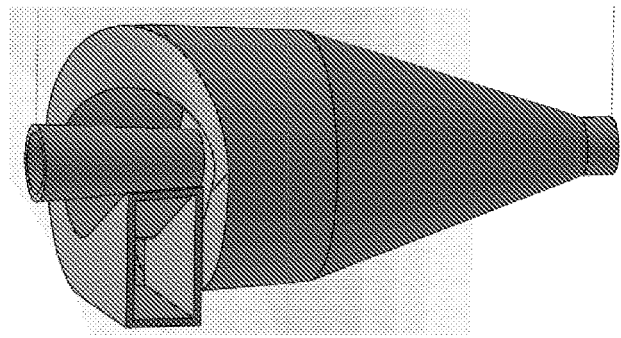
Figure 3I:
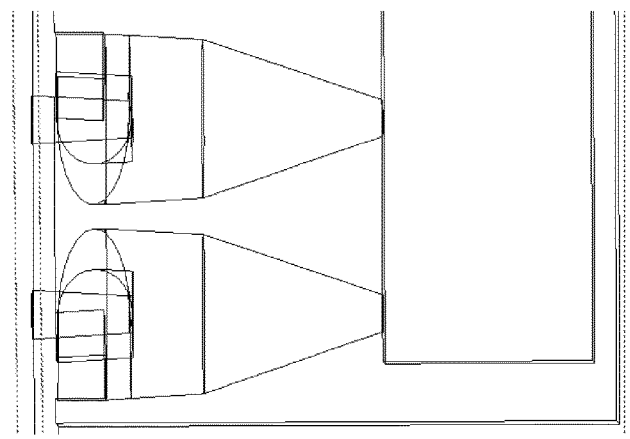

Further example embodiments showing the formation of large filtration sheets containing a large number of vortex separators are shown in FIGS. 3C-K. FIGS. 3C-D show an example vortex separator 360 with a combination of cylindrical (or semi-cylindrical) and conical profiles configured to facilitate the creation of a vortex when a gas enters the vortex separator 360 through the inlet 350. FIGS. 3D (as well as 3G and 3J) show the hollow volume of the vortex. Other examples with different profiles are shown in FIGS. 3F-G and 3I-J, illustrating that there may be several shapes and profiles that one can use for the vortex separators provided that the shapes and profiles facilitate the formation of a vortex when gas flows into the chamber of the vortex separator. As the gas enters the vortex separator 360, it is faced with a tapering entry port 340 that directs the gas to a gradual and circular flow about the central axis of the vortex separator 360. Such a flow facilitates the creation of a vortex in the chamber of the vortex separator 360. In some embodiments, the slope of the entry port may be varied to control the flow of gas into the vortex separator 360 so as to reduce flow resistance and turbulence. Further, as disclosed previously, the vortex separator can be sized so as to support vortices with ultra small diameters so that the centrifugal force experienced by particles suspended in the gas is very high. For example, both the vortex separator and the vortex may have diameters in the range of from about 1 mm to about 10 mm, from about 2 mm to about 8 mm, from about 4 mm to about 6 mm, etc. The small size of the vortex separators may limit the amount of gas throughput that can be treated by the separator. In some embodiments, however, a massive number of the vortex separators 360 may be arranged in a repetitive manner into a monolithic filtration sheet 370 that is capable of handling and treating a large gas throughput. For example, from about $10^2$ to about $10^8$, from about $10^3$ to about $10^7$, from about $10^4$ to about $10^6$, about $10^5$ vortex separators may be arranged (e.g., in a repetitive and/or periodic pattern) to form a monolithic filtration sheet capable of handling a large gas flow (e.g., about 100 CFM, about 1000 CFM, about 2500 CFM, etc.). FIGS. 3E and 3H show example embodiment of such a monolithic filtration sheet 370 containing a large monolith of vortex separators. In this particular embodiment, each vortex separator is coupled to a separate reservoir configured within the monolith for receiving captured solid particles and/or containing scrubbing fluid for use in cyclonic scrubbing of contaminated gases. In this embodiment, another feature demonstrated is the use of monolithic rows with gaps ("streets") between then. Air flows through these gaps to reach to tangential inlets on the sides of these monolithic rows. In some embodiments, the filtration sheet may comprise a plurality of monolithic sheets, each monolithic sheet containing a large number of vortex separators.

Figure 3K:
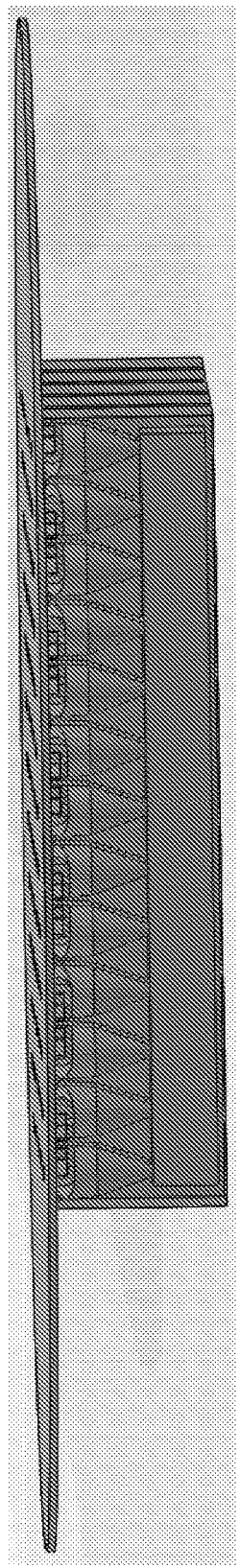

In FIG. 3K, a plurality of vortex separators share a single large reservoir, allowing for fluidic communication between the vortex separators. In some cases, there may be several reservoirs where at least one of them may be shared by more than one vortex separators. In some embodiments, the shared reservoirs may have separators (e.g., partial or complete) configured to assist in the even distribution and settling of captured solid particles deposited in the reservoirs.

Figure 4A:
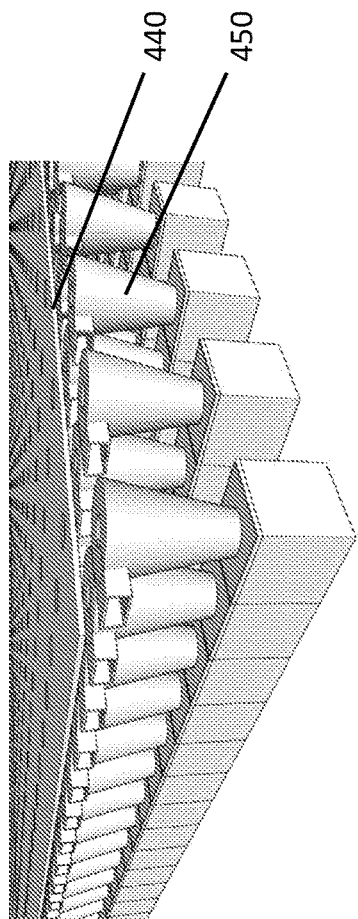
FIGS. 4A-C show example illustrations of the process of forming a monolithic sheet containing an assembled array of vortex separators using two stamped layers, according to some embodiments.

As shown in FIGS. 3A-B, the monolithic sheet 300 comprises a plurality of the vortex separators 190 (e.g., FIG. 1B) arranged in a manner to receive gas from one side of the planar sheet and release the treated gas on the opposite side. It is to be noted that although the planar sheet comprises a plurality of the vortex separators 190 of FIG. 1B, in some embodiments, the planar sheet 300 may be a monolithic sheet. For example, as shown in FIG. 4A, the upper plane 320 of the sheet 300 may be a single planar plane that is perforated (i.e., with openings, holes), where the holes may be aligned concentrically with the outlet 180 (e.g., FIG. 1A) of the vortex separator 100 or 190. Similarly, the bottom plane 330 may be a monolithic plane containing a series of inlets 170 for allowing gases into the scrubbing system for treatment. While the entire structure is understood in terms of its geometric repetition of a unit cell, monolithic realization of these arrays is useful and in some cases essential in facilitating practical manufacturing and deployment of very large number of very small features, much like monolithic integrated circuits ("semiconductor chips") were essential enablers of large scale digital electronics.

In some embodiments, the entire sheet 300 may represent a single monolithic unit that can be mass produced by injection molding, from any suitable plastic, resin, polymer, metals, fiber base materials, glass, ceramics, crystalline solids, organic materials, composites, and/or the like. The monolithic sheet 300 can be defined by a perforated upper plane 320 and miniature hollow cones extending downwards, and with the appropriate openings configured for air to flow into and out of the cones. The size of the sheet is limited only by the cost of the mold and the injection flow parameters. Larger sheets can be configured simply by placing several smaller sheets together. For example, if the unit cell (e.g., the vortex separator 190 of FIG. 1B) is a 2 mm×2.5 mm rectangle, there are 20 cells per $cm^2$ and 200,000 cells in a square meter. While it is likely possible to manufacture this entire square meter sheet as a monolithic structure, it may be easier to assemble 4 sheets each 50 cm×50 cm monolithic sheet. In some embodiments, unit vortex separator with sizes in the sub millimeter range may be fabricated. For example, the width and length of a unit vortex separator may range from about 0.1 mm to about 5 mm, from about 0.25 mm to about 2.5 mm, from about 0.5 mm to about 2 mm, from about 1 mm to about 2 mm, including all values and sub ranges in between.

In some embodiments, a monolithic sheet can be formed by a repetitive geometric pattern of a unit cell where each cell can contain more than one vortex separator and/or vortex chambers. A plurality of vortex separators may share a common inlet opening for facilitating the flowing in of air into scrubbers (Ditto about a common outlet opening for facilitating the flowing of treated fluids out of scrubbers). For example, the common inlet opening may be operationally coupled to the inlet 170 of each vortex separator. In some embodiments, a plurality of vortex separators may share a common outlet opening for allowing treated gas to exit the scrubbing system. For example, the common outlet opening may be operationally coupled to the outlet 180 of each vortex separator. In some embodiments, the entire plurality of scrubbers may be geometrically repeated to form large sheets of any desirable size. In such embodiments, each vortex separator can be as small as desired, facilitating an efficient scrubbing of suspended particles from circulating gases. As a concrete example, four cones can have a common opening in the lower plane that feed incoming air into each of the four cones. Optionally, the four cones can also have a common opening in the upper place that allows treated air to be released. The entire 4-cone unit cell can then be repeated geometrically, with small gaps between unit cells for air access to the inlets, to form large sheets of any desirable size, while the cones can be as small as needed to achieve the effective separation of fine particles.

Although the above discussion was related to plastic injection molding as a manufacturing process for fabricating the cyclonic scrubbing sheets, in some embodiments, other techniques may also be used to produce the sheets. Initially, molding may not be limited to plastic or to injection molding, but can apply to any soft or malleable material that can be formed into a preset mold and subsequently be hardened or cured. Further, alternative manufacturing processes besides or in addition to injection molding include 3-dimensional printing, also known as additive manufacturing. It can be used to achieve extremely high precision and fine features, well below 100 microns, and allowing production of monolithic arrays of sub-millimeter cyclones (e.g., linear dimensions ranging from about 0.01 mm to about 5 mm, about 0.05 mm to about 2 mm, from about 0.1 mm to about 1 mm, from about 0.5 mm to about 1 mm, including all values and sub ranges in between) with millions of cells per square meter.

Another manufacturing technique can be any of a class of planar forming or imprinting processes. It may include two or more layers to be imprinted separately then to be aligned and attached. Thermoforming, vacuum-forming, embossing, stamping and nano-imprinting are all low cost processes for creating repetitive geometric and topographical features in a planar material and can achieve extremely high repetition accuracy and high resolution, in some cases well below a single micron. The sheet materials can be any suitable material, including plastic, metal, composite, fiber or other. The features are formed in a hard stamp and transferred to the planar sheet using any of mechanical pressure, vacuum and heat. This process not only allows large surfaces to be patterned quickly, it can be used for continuous roll-to-roll production.

In some embodiments, any one of these manufacturing techniques can be combined with one or more of the others to manufacture components of the scrubbing cleaning system. For example, two or more layers can be formed separately by injection molding and later attached to each other to form the complete structure. They can be attached by adhesive, welding or, if properly designed, simple mechanical attachments ("snap on"). In another example injection molded cone elements can be mass produced as separate pieces and then aligned and attached to a perforated sheet in an extended, roll-to-roll process.

Figure 4B:
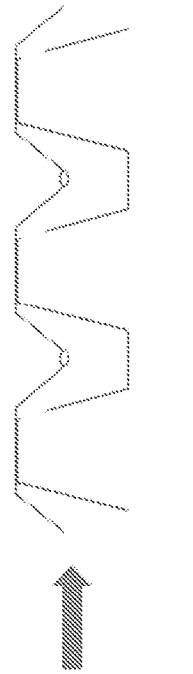
Figure 4C:
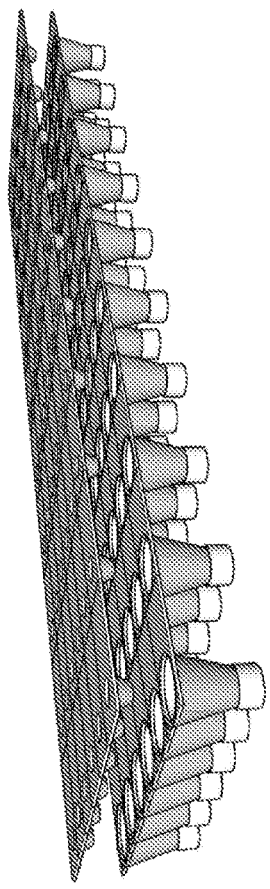

FIGS. 4A-C show the principles of a hybrid, 2-layer process where to form filter sheets of a desired size. Layer 440 and 450 may be produced by any suitable technique including thermo/vacuum forming, stamping, embossing, and/or the like. Top layer 440 may correspond to an upper plane 320 of the monolithic sheet 300 while lower plane 450 may correspond to at least a part of the vortex chamber 310 of the vortex separators. One of skill in the art will appreciate that the layers are not required to be made with the same technique, for example 440 can be made with vacuum forming and 450 with injection molding. FIG. 4B in particular shows schematically the attachment of the two layers to form monolithic filter sheets with vortex separators. In some embodiments, topographical features 480, 490 can be added to guide accurate alignment of the two layers 440, 450 before they are attached. The attachment can be facilitated by an adhesive or by welding with heat, pressure or ultrasonic welding. In one embodiment, multi-sheet thermoforming can be used to form and attach two sheets of material each with its own structure. Some of these planar processes can be implemented on a continuous roll, a technique known in the production of low-cost plastic packaging. Multiple variations of this general multilayer topographical method can be implemented, and can work at virtually any size, including below micron range (e.g., when linear dimensions of the scrubbing system are below a micron). In some embodiments, the resultant sheet can be rigid or flexible. A flexible sheet can be then configured to form compact filters or scrubbers, for example by folding, pleating, creating a V-bank configuration, rolling into cylinders or any other shape that allows enhanced and efficient filtering or scrubbing of gases while minimizing the volume taken up by the vortex separators.

Figure 5C:
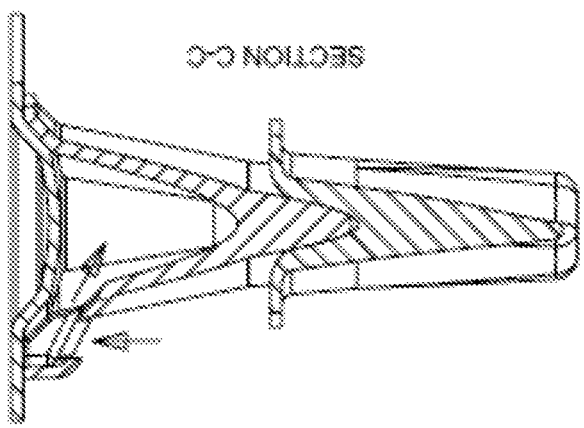
FIGS. 5A-K illustrate the process of forming a monolithic sheet containing an assembled array of vortex separators using a plurality of layers, according to some embodiments.
Figure 5B:
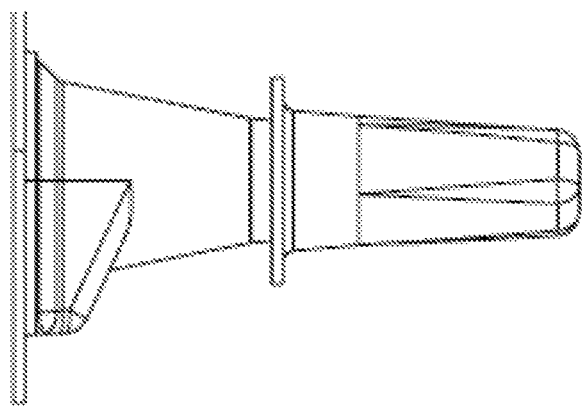
Figure 5A:
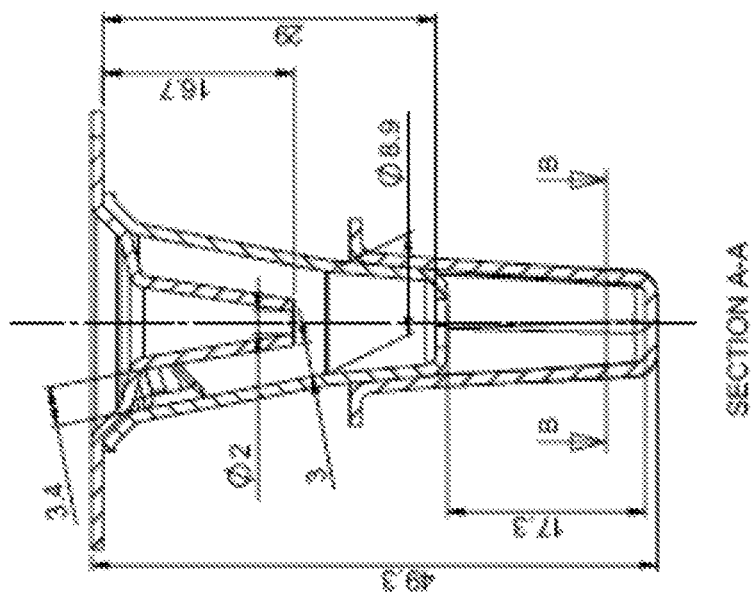
Figure 5D:
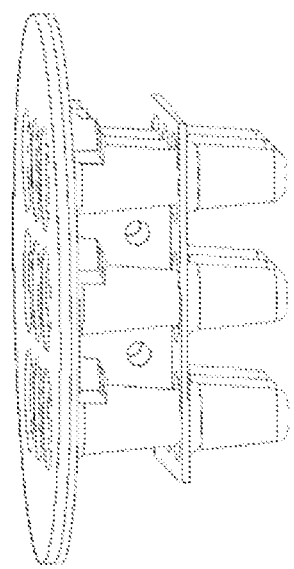
Figure 5E:
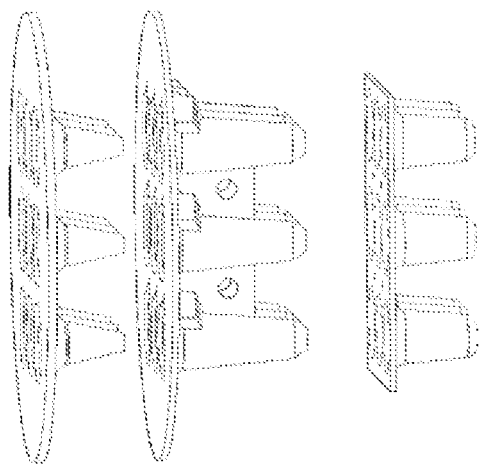
Figure 5F:
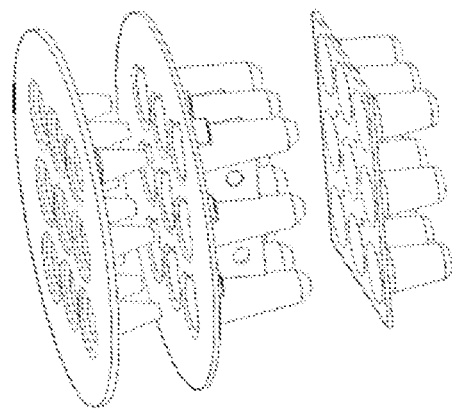
Figure 5G:
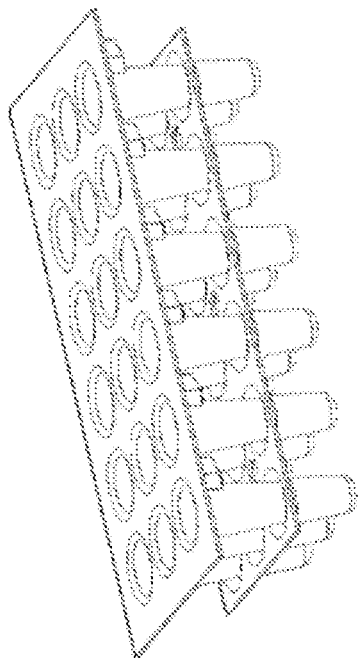
Figure 5H:
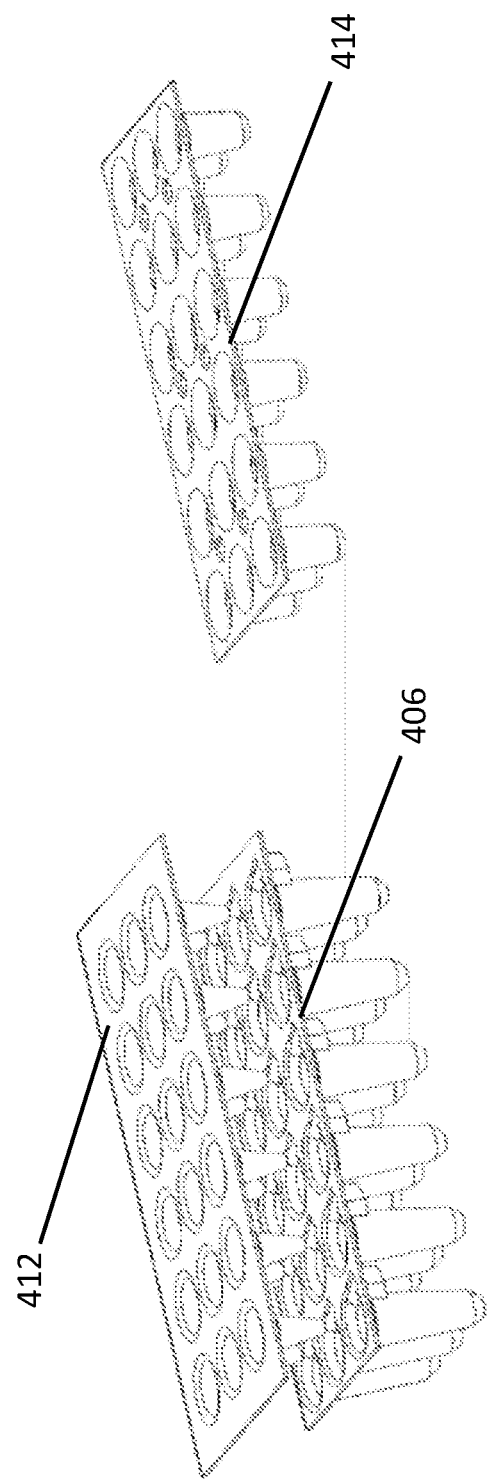

FIGS. 5A-5H illustrate in some greater detail the process of forming a monolithic sheet containing an assembled array of vortex separators using three layers, according to some embodiments. Although the figures show three layers, it is to be noted that a filtration or cyclonic scrubber sheet can be formed in principle from any number of layers (e.g., 1, 2, 3, 4, 5, 6, and/or the like). Similar to the embodiments of sheets formed from two layers, three-layered sheets (and in fact sheets containing any number of layers) can be formed using any one of the above-mentioned manufacturing techniques. In some embodiments, each sheet may be produced using a single technique (e.g., planar stamping techniques). In this example the sheets were all manufactured using vacuum forming manufacturing technique. FIG. 5A-5C show in some detail the design of a single vortex element made by attaching 3 vacuum formed layers. FIGS. 5D-5F show how a small array (9 elements) is made by attaching the layers: FIG. 5D shows the three layers attached, whereas FIG. 5E-5F show the exploded graphic of the layers before attaching. Finally FIG. 5G-5H illustrates how the structure can be scales to a large array, essentially unlimited in scalability, including a first top layer 412, intermediate layer 406, and second bottom layer 414.

Figure 5K:
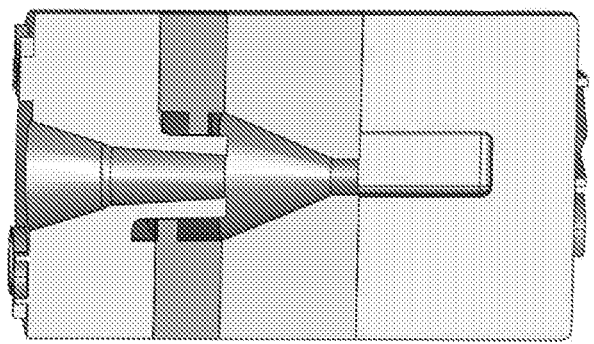
Figure 5I:
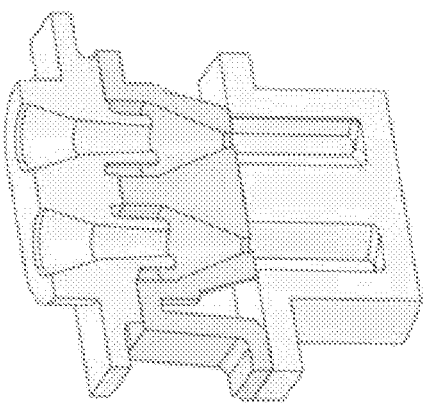
Figure 5J:
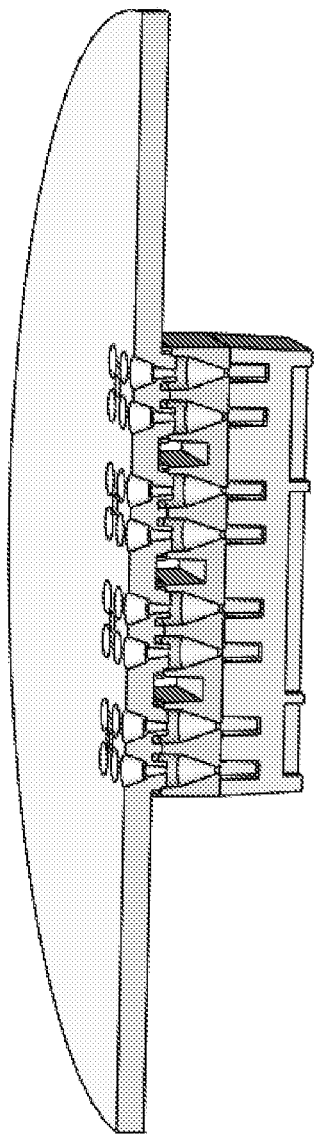

In some embodiments, however, different techniques may be used to produce the different layers of a sheet. This may be the case in particular when some layers can have a flat 2D structures and others are inherently of 3D shape that is not readily created by simply deforming a plane. For example, FIGS. 5I-5K show a three layered filtering or scrubbing sheet comprising a top 2D flat layer and two 3D bottom layers. In such embodiments, for example, vacuum forming processes and/or printing/stamping may be used for the top layer, while injection molding may be used for the bottom two layers. The choice of manufacturing techniques may be driven by reasons such required shape and tolerance, cost effectiveness, and/or the like. FIG. 5K shows an example embodiment of a four layer filtration or scrubbing sheet.

Figure 6A:
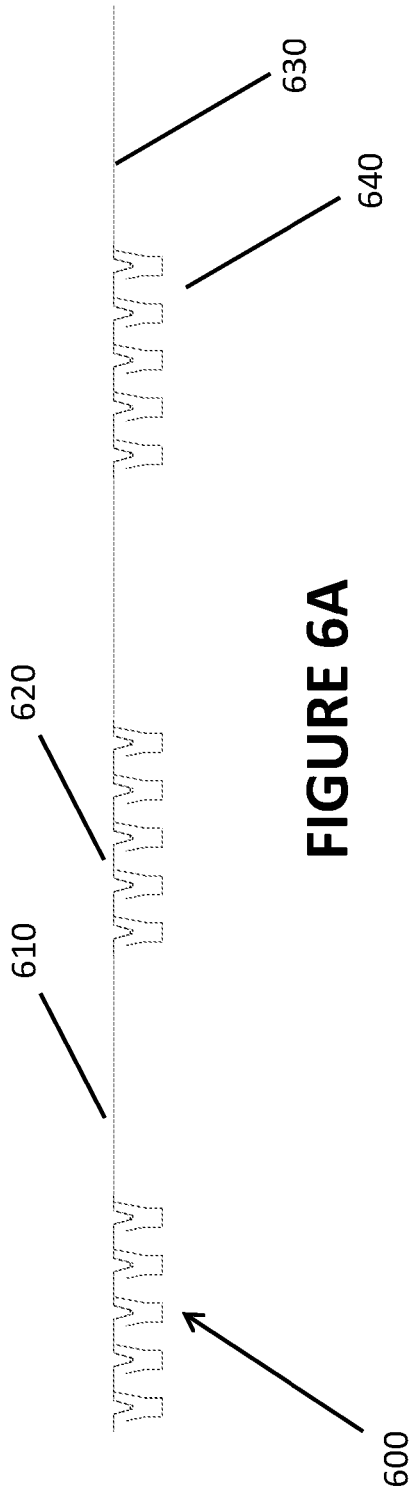
FIGS. 6A-B show example illustrations of a vortex separator sheet including blank strips configured for pleating when forming a vortex scrubber using the sheet, according to some embodiments.

In some embodiments, pleating of cyclonic scrubbing sheets may be used to minimize the volume of filters or cyclonic scrubbers, while still maintaining an efficient and enhanced gas cleaning performance. As shown schematically in FIG. 6A, for example, a vortex separator may be formed by attaching an upper layer 630 and lower layer 640.

In producing the vortex sheet 600, however, regions (610) of the upper plane 630 may be without features or perforations. That is, for example, half the sheet can be left "blank", namely just a flat sheet pleat with no cyclones and no air passage. And in the region of the lower sheet 640 that would align with the missing perforations, in some embodiments, features corresponding to the vortex chamber (e.g., features such as cones, outlets, etc.) may also be missing as well. As such, when the upper plane 630 and the lower sheet 640 are attached by one or more of the above-noted manufacturing techniques to form the sheet of vortex separators 600, there are regions such as 610 that contain no vortex separators while other regions 620 contain vortex separators. Accordingly, the entire sheet 600 of cyclones can be pleated in the form of a zig-zag or accordion, as shown schematically in FIG. 6B, allowing for successive cyclone-free region 610 and cyclonic region 620 to parallel each other, and consequently increase the surface area (and the fluid flow) of the entire system available for filtering or scrubbing contaminated gases. The reduction in the number of vortex separators in the sheet may be balanced by the higher pleating density, higher density following from reduction in the space and thickness of the entire scrubbing system. The sheet-like nature of the array of vortex separators lends itself to such pleating to achieve more surface area, i.e., a higher cyclone count, and higher air flow.

Figure 6B:
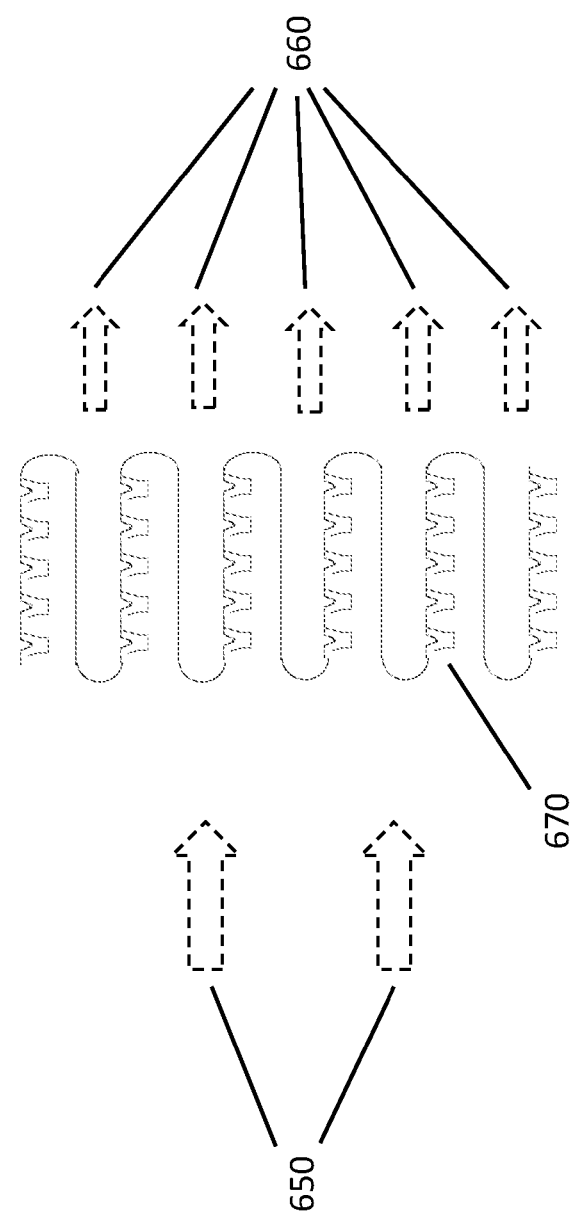
Figure 7B:
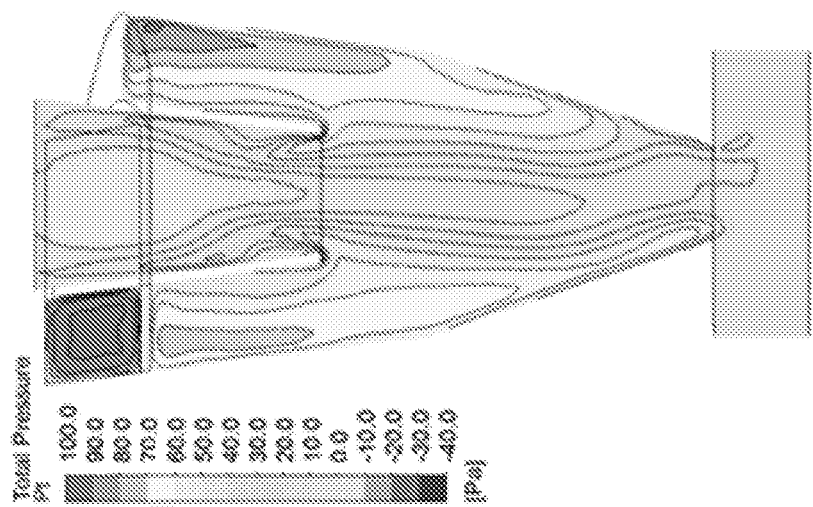
FIGS. 7A-D and 8A-C depict computational fluid dynamics (CFD) simulation results showing flow paths, velocities and pressures of air being cleaned in different sizes of vortex separator, according to some embodiments.
Figure 7A:
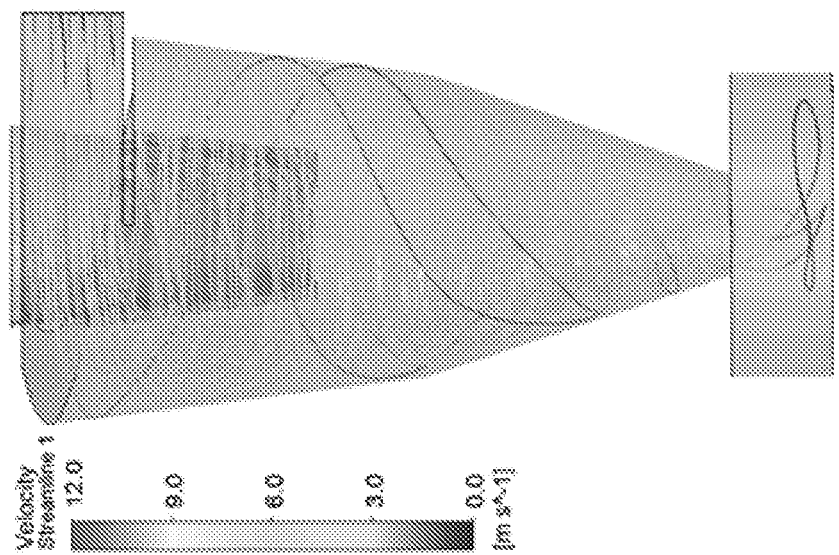
Figure 7D:
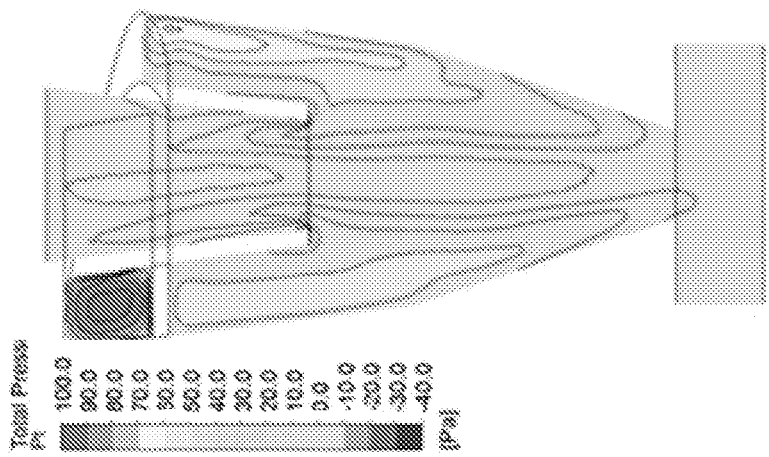
Figure 7C:
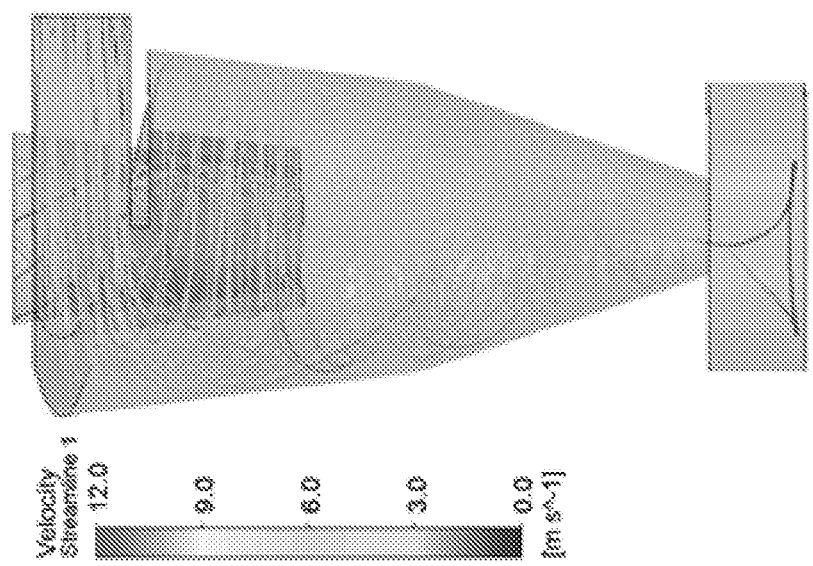

In some embodiments, pleating may also allow the filter unit to be positioned in an overall vertical orientation with approximately-horizontal pleats, suitable for horizontal air flow, e.g. as shown in FIG. 6B. The horizontal pleats allow the perpendicular cyclones as shown earlier to remain in a normal vertical orientation to gravity while operating in a system where the main air flow path can be horizontal. For example, the contaminated gas 650 may enter the entire sheet in a horizontal direction while the vortex separators 670 have a normal vertical orientation (e.g., with respect to gravity), and the treated gas 660 may still flow out in the horizontal direction. Further, in a pleated configuration, half the pleated surface may be "upside down" which would make the cyclones in those sections upside down and therefore potentially not functional. This can be addressed in several ways. In one embodiment, at the time of manufacture half the cyclones are formed upside down in the sheet, in anticipation of the pleated configuration. After pleating all the cyclones can be perpendicular to the ground. In this configuration, care may be taken so that the inlet and outlets of the upside-down cyclones are on the opposite side of the common sheet so that, after they are inverted, they can accept air flow in the specified direction relative to the sheet.

Figure 8C:
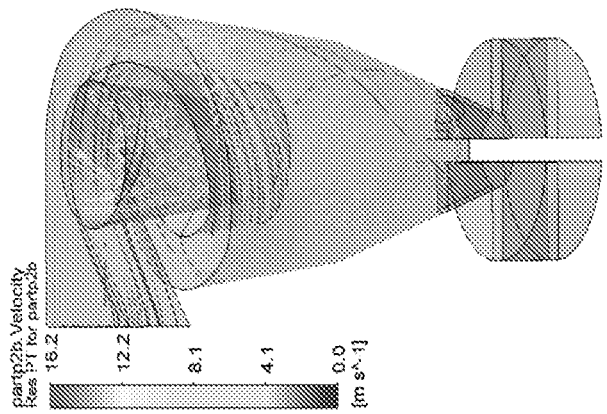
Figure 8B:
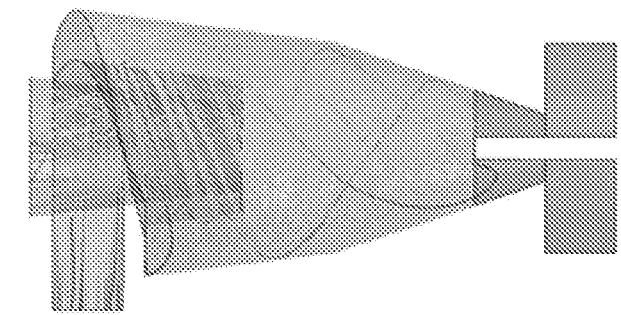
Figure 8A:
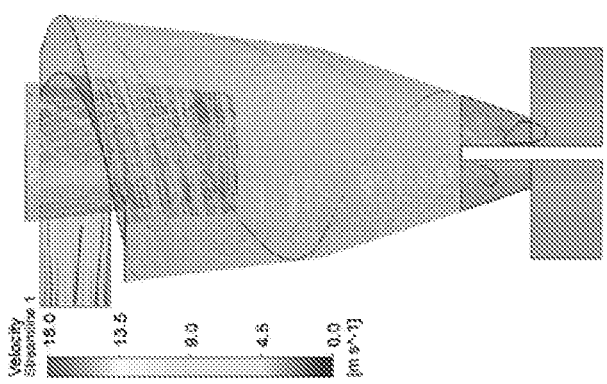

With reference to FIGS. 7A-D, in some embodiments, computational fluid dynamics (CFD) simulation results showing flow paths, velocity and pressure distributions for miniature vortex separators with top-rim diameters of 8 mm (FIGS. 7A-B) and 4 mm (FIGS. 7C-D) are presented. During the simulations, a static pressure differential of about 100 pa was modeled between the inlet and the outlet (i.e., a drive pressure of 100 pa). The simulation results illustrate that for these geometrical dimension at 100 pa driving pressure, typical velocities in the cyclone are between 4-8 m/s. FIGS. 8A-C show velocity results for even smaller vortex separators, a top rim diameter of about 4 mm (FIG. 8A) and about 2.5 mm (FIG. 8B) with even higher drive pressure of about 250 pa (=1" water gauge pressure). FIG. 8C illustrates the expected swirl velocities in these conditions. In these embodiments, the particle receptacle or reservoir were partitioned to reduce air flow within the receptacle. The analyses of FIGS. 7A-D and FIGS. 8A-C allow for the optimization of the inlet and outlet forms as well as the shape (e.g., slopes) of the cones. Further, the results provide testable values for the fluid flow rates as well as centripetal acceleration (corresponding to the centrifugal forces in vortex chambers) for various driving pressures, and can be used to predict particle capture efficiency for various particle sizes. FIGS. 11A-11B present the experimental results on various vortex array filters with different designs. The results of FIG. 8A show air flow vs pressure drop whereas FIG. 8B shows particle capture efficiency vs particle size. Results corresponded well with the computational models.

Although the preceding discussion about vortex separators has focused on conical vortex chambers, in some embodiments, the vortex separators and/or the vortex chambers can have any structure that encourages the formation of a vortex by the fluid flow. Further, the discussions have focused on vortex separators where the outlets for releasing treated gas are located at the top of the scrubbers (i.e., the treated gas travels opposite to gravity when exiting the scrubbers). In some embodiments, for example with reference to FIGS. 9A-B, the vortex separating cyclonic elements can be inverted so that the air outlet can be at the bottom. In FIGS. 9A-B, the cyclonic cavity (the vortex separator cavity) is a simple cylinder (although it can also be made conical or multi-segmented with conical and cylindrical sections). Contaminated gas enters through an inlet 710 near the top (in this case shown as a hose adaptor but can be a simple opening). The gas flows downward along the outside of the cylinder, e.g., 740, and enters the cylinder 760 tangentially though an inlet 750 at the bottom of the cylinder 760. Inside the cylinder the gas circulates upward, as shown by the dashed arrows, and eventually exits down and through the concentric outlet tube 720 in the middle of the cylindrical cavity. The liquid reservoir 730 has a section underneath the cylinder and also extends vertically, shown in the drawing on the right-hand side of the cylinder, and is partially filled with scrubbing liquid.

There is an opening at the bottom of the cylinder to the reservoir, and liquid enters the cylinder through the opening. Several forces may contribute to draw liquid into the cylinder, depending on the air pressure and flow rate and the amount of liquid in the reservoir. These forces include, but are not limited to, the Bernoulli Effect, air-to-liquid drag, and hydrostatic pressure of the liquid column. Scrubbing liquid can be carried by the circulating air stream in an upwards spiral, e.g., 780, in the form of an aerosol (shown in dashed arrows). On the upper end of the cylinder there is an opening to the reservoir where the liquid is pushed out and back into the reservoir, e.g., 770.

The size and shape of the openings can be varied depending, for example, on the air flow velocity, the liquid properties, and/or the overall dimensions of the cylinder. In one embodiment the opening is a plurality of small holes in the sidewall of the cyclone cavity. In another embodiment the opening is an elongated slit that is substantially horizontal, such that liquid is expelled when it reaches the height of that opening. In another embodiment the opening extends vertically, allowing liquid to be expelled over a range of heights relative to the vortex separator (cyclone). In yet another embodiment the entire top of the cylindrical cavity is open to a space that connects with the reservoir.

The inner wall of the cyclonic cavity can be smooth or can comprise topographical features. A smooth surface is desirable for settling of solid particles and liquid droplets on the wall and thereby separating them from the air stream that exits through the concentric outlet. On the other hand textures and features can facilitate the continual conversion of the liquid into aerosol, thereby increasing its ability to capture solid particles from the air stream. In some embodiments, certain sections of the inner wall can be textured while other sections are smooth. In some embodiments, liquid and/or solid agent materials configured to assist with the capturing of particles suspended in the circulating gas may be located along the inner wall.

The size of the unit shown can vary from very large to very small. In some embodiments, the overall height of the entire cyclonic scrubbing element can range from about 0.5 mm to about 25 cm, from about 1 mm to about 20 cm, from about 50 mm to about 15 cm, from about 500 mm to about 15 mm, from about 1 cm to about 10 cm, from about 5 cm to about 10 cm, including values and subranges in between. Similarly the height of the concentric outlet tube can be designed to achieve optimal air cleaning while minimizing the amount of liquid droplets that are collected into the outlet where they can escape. In one embodiment the outlet tube can be about 10%, about 20%, about 30%, about 40%, about 50%, about 60%, about 70%, about 80%, about 90% of the height of the cylinder, including values and subranges in between.

In this "upside down" configuration the vortex separator (cyclone) does not have to be exactly cylindrical and can have a conical profile of slope. It can have a combination of conical and cylindrical sections. In some embodiments the outlet tube can also have a conical or tapering profile, for example where the entry port of the outlet tube is narrower than the outlet, to provide good selectivity without causing excessive parasitic flow resistance.

Reducing the escape of liquids through the air outlet can be achieved with a number of design features. In some embodiments the outlet tube extends beyond the sidewall liquid openings to minimize liquid escaping through the tube. In some embodiments, any number of baffles or splash guards can be incorporated within the cavity or around or near the outlet tube to block droplets from traveling towards the outlet tube.

In some embodiments, one may form an array or sheet using the vortex separators of FIGS. 9A-B as described above with respect to FIGS. 3A-E and 6A-B, allowing for low-cost, mass produced air cleaning assemblies that can be placed in line with an existing air stream such as those found in ventilations systems, air handlers or air filtration systems. For example, FIGS. 10A-B show a single passive vortex separator element that can be used as a part of a monolithic array, where FIG. 10A shows the outside structure, which is principally analogous to FIGS. 9A-B but with a planar inlet 810 on the top side, and an outlet 820 on the bottom. FIG. 10B illustrates the exact same element as FIG. 10A but in semi-transparent form, showing the inner cyclone cavity as well as the liquid reservoir. FIG. 10C shows a semi-transparent top view of FIG. 10A, representing the direction of the fluid entry (i.e., fluid flows from top to bottom, where the image is looking down on the top of the element). In some embodiments, the length of the entire vortex separator element can range from about 0.5 mm to about 15 mm, from about 1 mm to about 12 mm, from about 5 mm to about 10 mm, about 8 mm, including values and subranges in between.

The element can be made of any suitable material, including a wide variety of plastics, resins, polymers, glass, ceramic, metal, and any other moldable materials, and the size of this element can very small. In some embodiments, 3-D printing technology can be used to make elements with overall height of about in the range from about 0.1 cm to about 5 cm, from about 0.2 cm to about 2 cm, from about 0.5 cm to about 1.5 cm, about 1 cm, and wall thickness ranging from about 0.05 mm to about 2 mm, from about 0.1 mm to about 1 mm, from about 0.1 mm to about 0.5 mm, about 0.2 millimeters, including values and subranges in between.

Figure 10H:
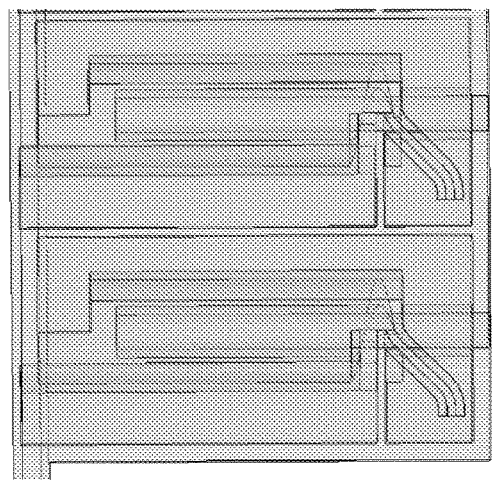
Figure 10G:
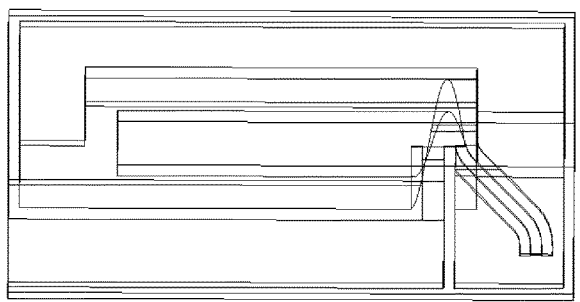
Figure 10F:
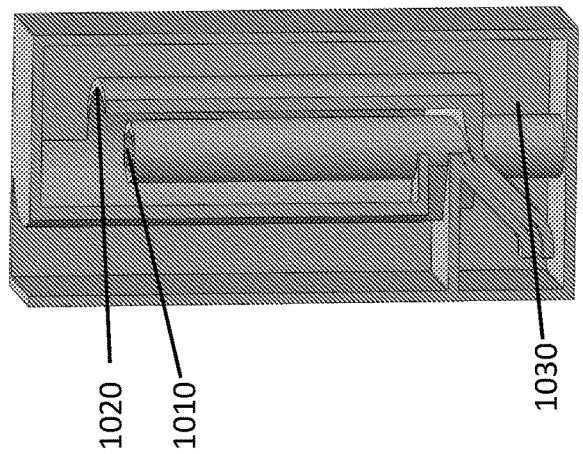
Figure 10I:
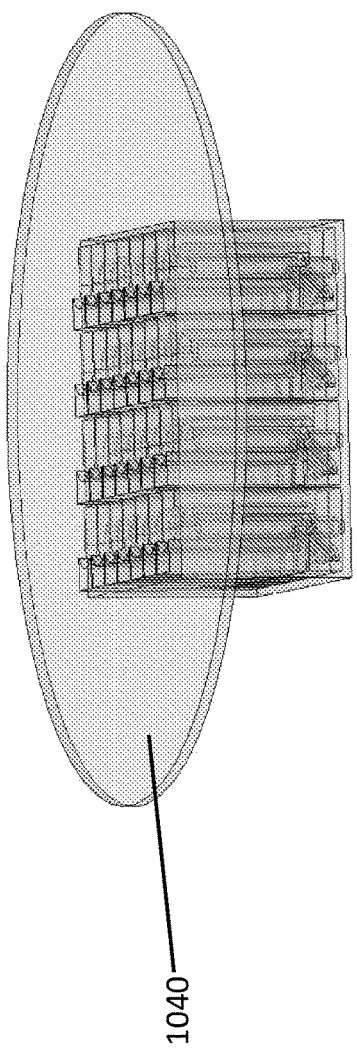

In some embodiments, one may form an array or sheet using the vortex separators of FIGS. 10A-B as described above with respect to FIGS. 3A-E and 6A-B. Multiple vortex separator elements can be configured side by side in a single monolithic sheet, which essentially forms a passive filter that performs as a vortex separator, examples of which are shown in FIGS. 10D-E where the unit cell is the vortex separator of FIGS. 10A-B. Arrays of any size can be manufactured with existing techniques such as injection molding, thermoforming, vacuum forming, 3D printing, lithography, and any other suitable technique. Further, similar to the discussions with respect to FIGS. 6A-B, the arrays or sheets formed from the vortex separators of FIG. 9A or 10A-B pleated. FIGS. 10F-G show another embodiment of a vortex separator similar in at least some aspects to FIGS. 9A and 10A. In these embodiments, there may be a cutout 1020 in the inner wall of the vortex chamber (of the vortex separator) that is close to the outlet 1010 through which gases exit the vortex separator. The droplets that capture the contaminants suspended in the gases may then flow over the cutout 1020 towards the reservoir 1030, returning the scrubbing fluid of the vortex separator back into the reservoir along with the captured contaminants. As discussed above with respect to other embodiments of vortex separators, such a system allows the vortex separator to be self contained and closed. In such embodiments, one may use more expensive scrubbing fluids which would not be practical if the scrubbing fluids were allowed to leave the separator in at least a substantial manner. FIGS. 10H-I show example embodiments of the formation of a single monolithic sheet of cyclonic scrubbers based on the vortex separators of FIG. 10F-G, including a top layer sheet 1040. As related above, the single monolithic sheet can be formed by utilizing an number of the above-noted manufacturing techniques such as but not limited to vacuum forming processing, injection molding, etc.

In some embodiments, the scrubbing liquid may be supplied during the manufacturing process through the inlet or the outlet. The amount of liquid can be controlled during this process in a number of ways. For example, a desired volume of liquid may be dispensed into each element in the array using an array of individual nozzles that line up with each element and dispense the required amount of liquid.

In another embodiment excess liquid may initially be dispensed into each vortex separator and the precise amount may be achieved by precise removal of the excess amount. Excess liquid can be removed during the manufacturing process, after the initial charge, either by a prescribed tilting procedure that, depending on angle and time, removes any liquid above a certain amount. Excess liquid can also be removed by blowing it out with an air stream at a certain specified tilt of the system, the combination of which achieves the required precision.

In some embodiments, for the liquid charge to remain in the reservoirs during transport and installation, one may apply removable adhesive film or seal to one or both sides of the array or sheets (FIGS. 10D-E, for example). This film can be peeled off at the site of installation of the array filter, immediately before or after the array is installed. In another embodiment multiple sheets can be packaged tightly together so that each sheet serves to seal the inlets or the outlets of the adjacent sheet, protecting the liquid in the reservoir from accidentally leaking or pouring out until the sheets are unpacked at the site of installation. Topographical features may be designed into the sheet to facilitate effective sealing of the inlets when sheets are stacked and packaged.

It is to be understood that although the disclosed embodiments have been directed at the cleansing (filtering, scrubbing, etc.) of air, the embodiments may also apply to other systems, such as but not limited to other gases as well as other fluids (for example liquids such as water, etc.). The application of the embodiments of this disclosure may depend on the type of fluids to be treated. For example, the embodiments can be applied to water filtration systems similar to their application to air filtration systems. In such embodiments, however, the cyclone or vortex scrubbing systems of the instant disclosure may have to be constructed out of stronger materials since fluid flow may require higher pressure and forces than gases, for example.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to translocation control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also within the scope of some of the embodiments of the present disclosure is the specific lack of one or more features that may be present in the prior art. In such embodiments, patentable claims may include negative limitation to indicate such lack of one or more features taught in the prior art in, for example, any one or more of certain disclosed apparatuses, systems, and methods.

What is claimed is:

1. An air/fluid filter replacement cartridge for an HVAC system comprising:
    at least one first planar layer of material;
    at least one second planar layer of material,
    wherein:
        each of the first planar layer and the second planar layer includes, as a formed portion thereof, at least one corresponding portion of each of a plurality of vortex separators, formed via a planar technique that imparts topographical features therewith,
        respective portions of each of the first layer and the second layer include successive vortex separators free areas,
        the first layer is assembled with the second layer so as to form a rectangular sheet of an arranged array of the plurality of the vortex separators,
        each vortex separator comprising at least a vortex chamber with cylindrical symmetry, a tangential inlet, and an outlet arranged at an end of the vortex separator,
        each tangential inlet is configured to be in communication with a respective incoming air/fluid flow of the sheet for filtering the air/fluid flow,
        each outlet exhausts air/fluid filtered by a respective vortex separator; and
    a plurality of receptacles included with the sheet, each configured for communication with a single respective vortex separator of the plurality of vortex separators, wherein the formed sheet is configured as a removable air/fluid filter replacement cartridge for a filter portion of an HVAC system.

2. The air/fluid filter replacement cartridge of claim 1, wherein the outlet comprises a concentric outlet.

3. The air/fluid filter replacement cartridge of claim 1, wherein each receptacle is configured as at least a portion of an apex portion of a respective vortex separator.

4. The air/fluid filter replacement cartridge of claim 1, wherein the flow within each vortex separator is configured to form at least one vortex during flow through the structure.

5. The air/fluid filter replacement cartridge of claim 4, wherein each formed vortex is configured to separate particles from the flow.

6. The air/fluid filter replacement cartridge of claim 1, further comprising a coating or a liquid, wherein the coating or liquid is arranged or introduced within each vortex structure.

7. The air/fluid filter replacement cartridge of claim 6, wherein the coating or liquid is configured with adhesive, antimicrobial and/or aerosol properties.

8. The air/fluid filter replacement cartridge of claim 1, further comprising filtration particles, wherein the filtration particles are arranged or introduced within the vortex structures and/or a plurality of receptacles of the vortex structures.

9. The air/fluid replacement cartridge of claim 1, wherein the formed sheet is configured as a rectangular air/fluid filter replacement cartridge for an HVAC system.

* * * * *